United States Patent
Alcorn et al.

(10) Patent No.: US 6,943,804 B2
(45) Date of Patent: Sep. 13, 2005

(54) SYSTEM AND METHOD FOR PERFORMING BLTS

(75) Inventors: Byron A. Alcorn, Fort Collins, CO (US); Ronald D. Larson, Fort Collins, CO (US); Larry Jay Thayer, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 74 days.

(21) Appl. No.: 10/283,665

(22) Filed: Oct. 30, 2002

(65) Prior Publication Data

US 2004/0085322 A1 May 6, 2004

(51) Int. Cl.[7] .................................... G09G 5/00
(52) U.S. Cl. ....................... 345/582; 345/562
(58) Field of Search ....................... 345/561, 562, 345/537, 538, 545, 552, 582, FOR 105

(56) References Cited

U.S. PATENT DOCUMENTS

| | | | |
|---|---|---|---|
| 4,874,164 A | 10/1989 | Miner et al. | |
| 5,218,674 A | 6/1993 | Peaslee et al. | |
| 5,379,379 A | 1/1995 | Becker et al. | |
| 5,493,646 A | 2/1996 | Guttag et al. | |
| 5,644,758 A | 7/1997 | Patrick et al. | |
| 5,675,773 A | 10/1997 | Devic | |
| 5,745,739 A * | 4/1998 | Wang et al. | 345/569 |
| 5,909,219 A * | 6/1999 | Dye | 345/582 |
| 6,097,401 A | 8/2000 | Owen et al. | |
| 6,377,266 B1 | 4/2002 | Baldwin | |
| 6,389,504 B1 * | 5/2002 | Tucker et al. | 711/100 |
| 6,411,302 B1 * | 6/2002 | Chiraz | 345/545 |

* cited by examiner

*Primary Examiner*—Matthew C. Bella
*Assistant Examiner*—G. F. Cunningham

(57) ABSTRACT

Systems and methods are provided for performing a BLT (BLock Transfer). In accordance with one embodiment, a method uses a texture-mapping subsystem to perform the BLT by configuring the texture-mapping subsystem with coordinate values corresponding to a block of pixels to be transferred. In accordance with another embodiment, an apparatus comprises logic for defining a texture map from a source segment of memory corresponding to a frame buffer, logic for configuring a texture-mapping subsystem with coordinate values corresponding to a first block of pixels on a display, logic for using a texture-mapping subsystem to apply the texture map defined by the configured coordinate values to a destination segment of memory corresponding to a second block of pixels on the graphic display, wherein the application of the texture map effects a BLT of the data from the first block of pixels to the second block of pixels.

22 Claims, 18 Drawing Sheets

SYSTEM AND METHOD FOR PERFORMING BLTS

BACKGROUND OF THE INVENTION

1. Field of the Invention

The present invention relates to computer graphics systems and, more particularly, to a novel system and method for performing BLTs (BLock Transfers) in computer graphics systems.

2. Discussion of the Related Art

In the field of computer graphics, pictorial information is often stored as a bitmap, in which each pixel of an image corresponds to at least one bit in the bitmap. Generally, the number of bits used per pixel depends on the color pallet or spectrum supported by the graphics application. Often all or part of a bitmap must be moved from one location in a computer's memory (the "source" location) to another location (the "destination" location). Transfers of this type are called bitmap block transfers, or "BLT"s for short, and are typically carried out by a computer's operating system in response to a function call from an application program.

In one situation, an application program may have "drawn" a figure within a window displayed on a display. The representation for this figure may be stored in a bitmap within the system or graphics memory. To display the figure rapidly on the screen of a display device, the bitmap is block transferred (or "blitted") from the source memory location to the video display (destination) memory location (e.g., frame buffer). A display device associated with the video display memory then displays the bitmap containing the figure. The video display memory is also commonly referred to as the screen memory or frame buffer for the display device.

Another common situation in which bitmaps (or blocks of memory) are blitted arises when a user (through a graphics interface) uses a mouse, for example, to drag a window from one screen location to another. In response to commands or function calls from the application program, in this case a window manager, a memory block corresponding to the source window is blitted to a memory block corresponding to the destination window.

In the past, graphics systems have used two-dimensional (2D) hardware to perform BLTs. In scalable three-dimensional (3D) systems, blitting has often caused problems due to bus limitations. Other circumstances also arise that create problems in performing BLTs. For example, if a window is only being moved slightly, such that the source and destination windows overlap, problems arise.

Furthermore, in systems having multiple/parallel rasterizers that are physically located on different integrated circuits, additional problems develop. Implementations in past graphics systems have involved the duplication of the frame buffer or other graphics data in the local memory associated with each of the rasterizers. When a BLT was performed, this required synchronization among the various parallel memories.

SUMMARY OF THE INVENTION

The present invention is broadly directed to systems and methods for performing a BLT. In accordance with one embodiment a method uses a texture-mapping subsystem to perform the BLT configuring the texture-mapping subsystem with coordinate values corresponding to a block of pixels to be transferred. In accordance with another embodiment, an apparatus comprises logic for defining a texture map from a source segment of memory corresponding to a frame buffer, logic for configuring a texture-mapping subsystem with coordinate values corresponding to a first block of pixels on a display, logic for using a texture-mapping subsystem to apply the texture map defined by the configured coordinate values to a destination segment of memory corresponding to a second block of pixels on the graphic display, wherein the application of the texture map effects a BLT of the data from the first block of pixels to the second block of pixels.

DESCRIPTION OF THE DRAWINGS

The accompanying drawings incorporated in and forming a part of the specification, illustrate several aspects of the present invention, and together with the description serve to explain the principles of the invention. In the drawings.

DETAILED DESCRIPTION

Figure 1:
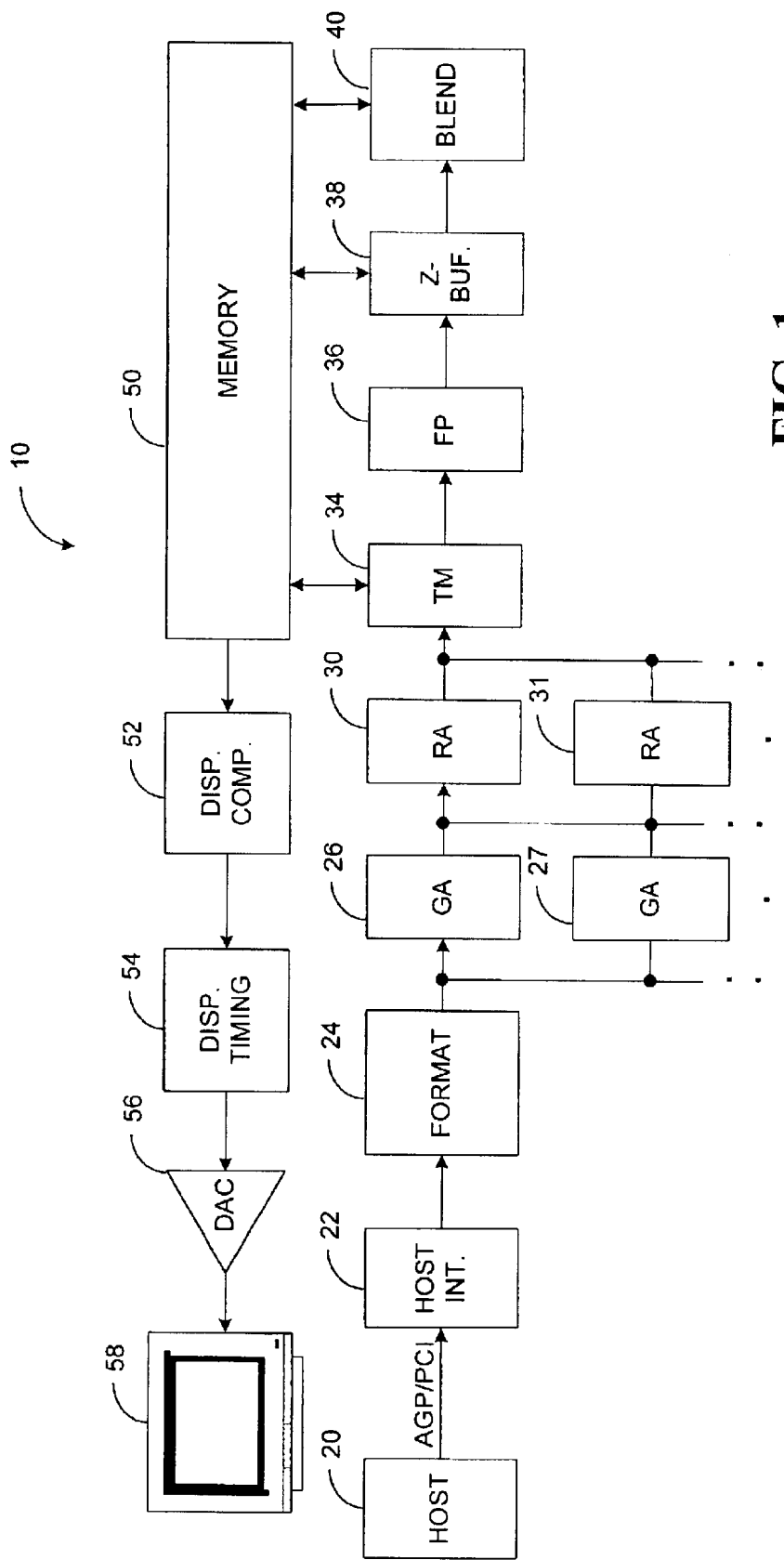
FIG. 1 illustrates a block diagram of a computer graphics system in accordance with the prior art.

As summarized above, the present invention provides a novel system and method for performing BLTs. For a more complete understanding and disclosure of the relevant graphics subsystems that are utilized to implement the inventive features, additional discussion will first be presented on the relevant components in conventional graphics subsystems.

Computer graphics systems are commonly used for displaying graphical representations of objects on a two-dimensional video display screen. Current computer graphics display systems provide highly-detailed representations and are used in a variety of applications. A computer graphics display system generally comprises a central processing unit (CPU), system memory, a graphics machine and a video display screen.

In typical computer graphics display systems, an object to be presented on the display screen is broken down into graphics primitives. Primitives are basic components of a graphics display and may include points, lines, vectors and polygons (e.g., triangles and quadrilaterals). Typically, a hardware/software scheme is implemented to render, or draw, the graphics primitives that represent a view of at least one object being illustrated on the display screen.

Generally, the primitives of a three-dimensional object to be rendered are defined by the host CPU in terms of primitive data. For example, when the primitive is a triangle, the host computer may define the primitive in terms of the X, Y and Z coordinates of its vertices. Additional primitive data may be used in specific applications. Rendering hardware interpolates the primitive data to compute the display screen pixels that represent each primitive.

The graphics machine generally includes a geometry accelerator, a rasterizer, a frame buffer controller and a frame buffer. The graphics machine may also include texture-mapping hardware. The geometry accelerator receives vertex data from the host CPU that defines the primitives that make up the view to be displayed. As is known, the operations of the geometry accelerator are computationally very intense. One frame of a three-dimensional (3-D) graphics display may include on the order of hundreds of thousands of primitives. To achieve state-of-the-art performance, the geometry accelerator may be required to perform several hundred million floating point calculations per second. Furthermore, the volume of data transferred between the host computer and the graphics hardware is very large. Additional data transmitted from the host computer to the geometry accelerator includes illumination parameters, clipping parameters and any other parameters needed to generate the graphics display.

As is known, a rasterizer receives data representing figures or objects and then provides the pixel-like representation of the figures. As is also known, texture-mapping involves applying at least one point element (texels) of a texture to each point element (pixel) of the displayed portion of the object to which the texture is being mapped. Texture-mapping hardware is conventionally provided with information indicating the manner in which the texels in a texture map correspond to the pixels on the display screen that represent the object. Each texel in a texture map may be defined by S and T coordinates which identify its location in the two-dimensional texture map. For each pixel, the corresponding texel or texels that map to it are accessed from the texture map, and incorporated into the final Red, Green, Blue (RGB) values generated for the pixel to represent the textured object on the display screen. In addition to two-dimensional texture maps, one-dimensional, three-dimensional, and even other-dimensional texture maps are also known. In this respect, the two-dimensional texture map has been mentioned for illustrative purposes only.

It should be understood that each pixel in an object primitive may not map in one-to-one correspondence with a single texel in the texture map for every view of the object. For example, the closer the object is to the view port represented on the display screen, the larger the object will appear. As the object appears larger on the display screen, the representation of the texture becomes more detailed. Thus, when the object consumes a fairly large portion of the display screen, a large number of pixels is used to represent the object on the display screen, and each pixel that represents the object may map in one-to-one correspondence with a single texel in the texture map, or a single texel may map to multiple pixels. However, when the object takes up a relatively small portion of the display screen, a much smaller number of pixels is used to represent the object, resulting in the texture being represented with less detail, so that each pixel may map to multiple texels. Each pixel may also map to multiple texels when a texture is mapped to a small portion of an object. Resultant texel data is calculated for each pixel that maps to more than one texel, and typically represents an average of the texels that map to that pixel.

To more particularly illustrate a conventional graphics system, reference is made to FIG. 1, which is a diagram illustrating a graphics pipeline 10. It should be noted at the outset that there are a variety of alternative manners to illustrate the graphics pipeline 10 illustrated in FIG. 1, and that the diagram of FIG. 1 is presented for illustration only.

As illustrated, a host computer 20 communicates with the graphics hardware across a high-speed bus, such as an AGP (accelerated graphics port) bus or a PCI (peripheral component interconnect) bus. A host interface 22 is typically provided at the front end of the graphics hardware to interface with the high-speed bus. A format block 24 is provided downstream of the host interface 22. At least one geometry accelerator 26, 27, and at least one rasterizer 30, 31 are provided downstream of the format block 24. Information produced or generated by each geometry accelerator is broadcast to all downstream rasterizers.

Downstream of the rasterizers 30 and 31 are texture-mapping hardware 34, a fragment processor 36, the Z-buffer 38, and blend hardware 40. The texture-mapping hardware systems illustrated include a local memory subsystem 50 that stores data representing a texture associated with the object being rendered.

Downstream of the texture-mapping hardware are subsystems including display composition 52, display timing 54, digital-to-analog converter (DAC) 56, and a display 58. The display composition hardware 52 processes different object/primitive layers to determine the color of a given pixel to be displayed.

Consistent with the general architecture and data flow of a graphics pipeline 10 like that of FIG. 1, prior art systems were known that provided multiple/parallel rasterizers and multiple/parallel texture-mapping subsystems, wherein each of the rasterizers and texture-mapping components communicated with a dedicated local memory.

Other systems are known that combine the rasterization hardware and texture-mapping hardware. In such systems there may be multiple/parallel combined rasterization/texture-mapping subsystems. Such systems typically have dedicated memory for each rasterizer/texture-mapping component. Such systems segment and dedicate portions of the display to the different rasterizer/texture-mapping components for processing. However, in order to process primitives extending across segment borders, systems implementing this type of parallelism often duplicate texture maps and other data across the separate memories, resulting in both capacity and bandwidth problems.

Embodiments of the present invention reside and operate in a unique nodal architecture in which nodes comprise functional units that intercommunicate across communication links. As will be understood from the discussion that follows, the unique design of this nodal architecture provides particularly efficient performance in a bandwidth-intensive operating environment. Further, in an embodiment that will be described herein, the communication links are serial links. It will be appreciated, however, that other (i.e., non-serial) communication links may be implemented consistent with the scope and spirit of the invention.

Figure 2A:
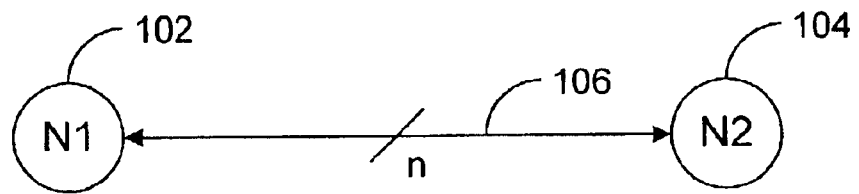
FIGS. 2A and 2B are diagrams illustrating a high-level nodal architecture, in which functional nodes are interconnected through serial links, in accordance with embodiments of the invention.

Referring to FIG. 2A, a system having two nodes 102 and 104 is shown. The two nodes 102 and 104 intercommunicate across a plurality of serial links 106. The number of serial links may vary from system to system, depending upon the speed of the serial links, and the bandwidth requirements of the system. As mentioned above, texture-mapping places high memory bandwidth demands on a graphics system. Thus, in systems like computer graphics systems, more communication links 106 will generally be desired than in lower bandwidth-demanding systems.

Figure 2B:
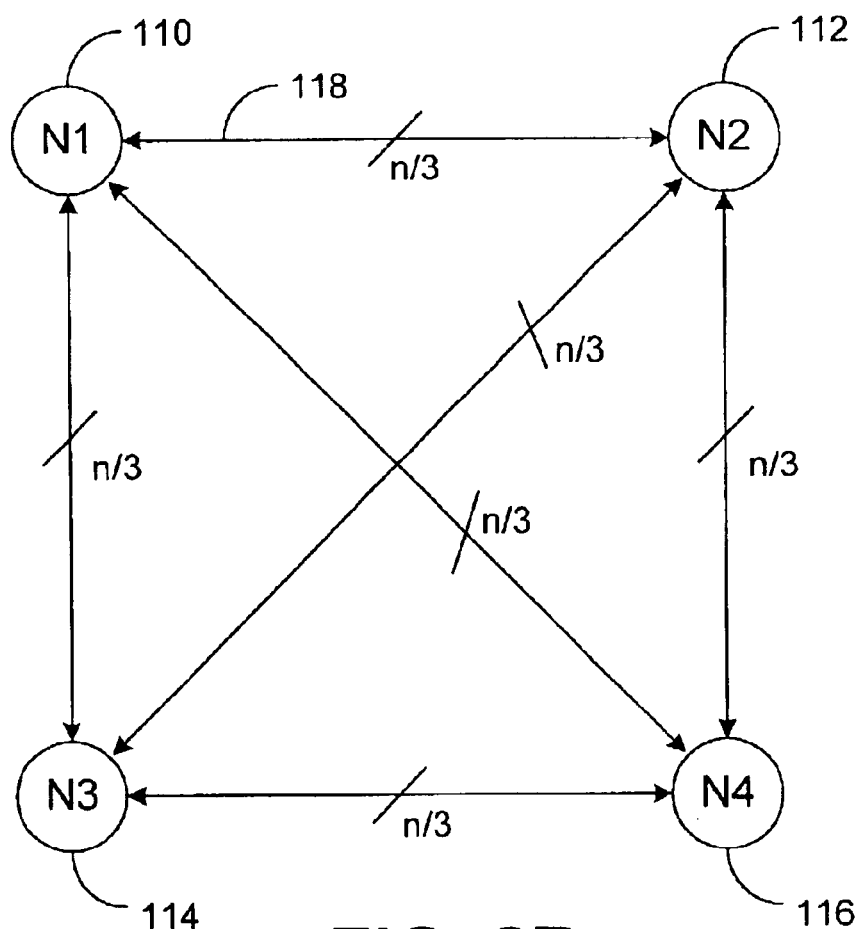

Referring to FIG. 2B, a system having four nodes 110, 112, 114, and 116 is shown. Like in the two node system of FIG. 2A, the four nodes 110, 112, 114, 116 intercommunicate across a plurality of serial links (e.g., 118). In a four-node system, however, the number of serial links interconnecting any two given nodes is reduced. In this regard, as the system is partitioned up into more functional processing nodes, fewer serial links are required to interconnect between each of the nodes. In the abstract example presented in FIGS. 2A and 2B, if n serial links are required to support the system bandwidth of the two-node system of FIG. 2A, then mathematically n/3 serial links are used to interconnect between each of the nodes in the four-node system of FIG. 2B.

For purposes of understanding the present invention, observe from FIGS. 2A and 2B that a bandwidth-intensive processing system may be partitioned up into functional nodes, whereby the functional nodes are designed to cooperatively operate to carryout the function of the system as a whole. In addition, the functional units intercommunicate across a plurality of serial links.

Figure 3:
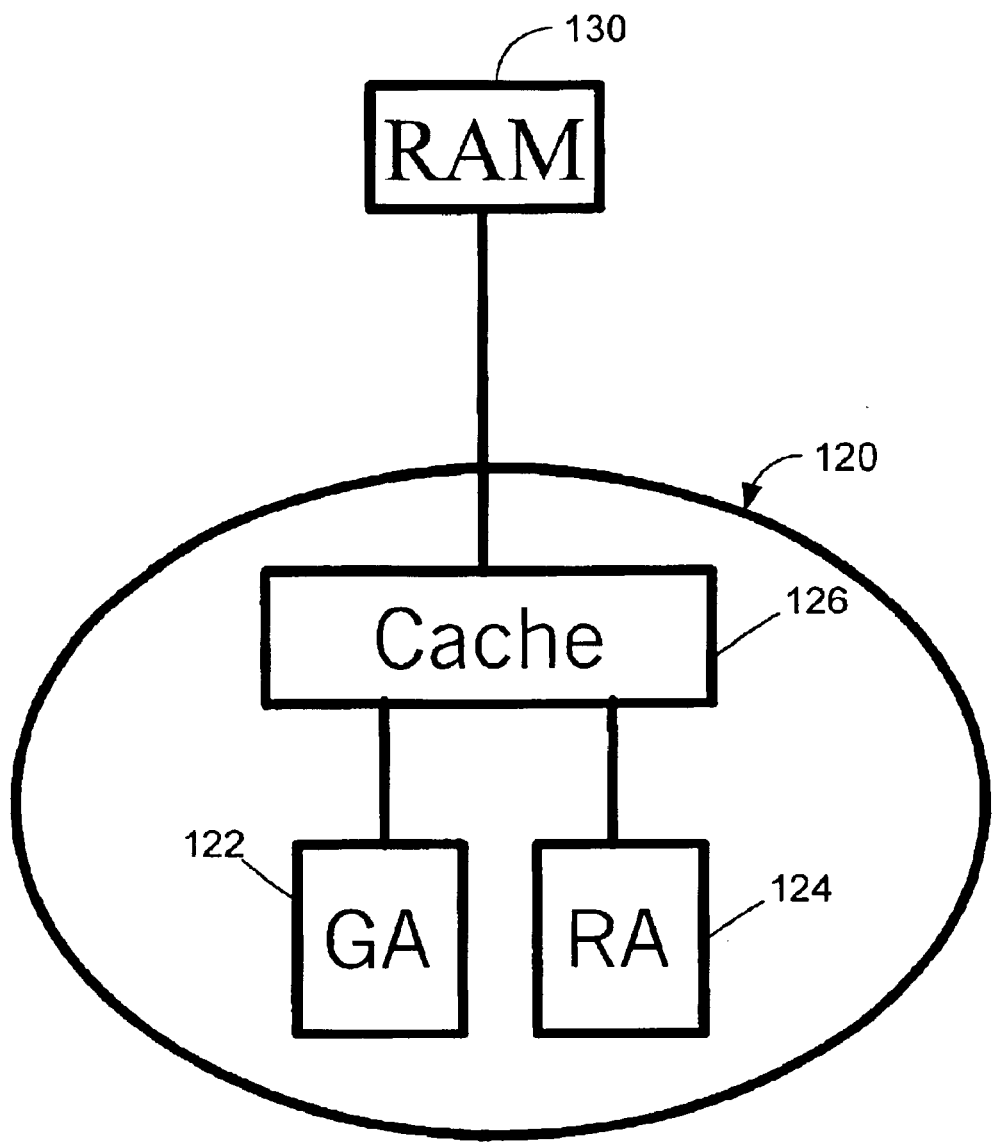
FIG. 3 is a diagram illustrating a functional node containing a geometry accelerator, a rasterizer, and a cache in communication with a local RAM.

Having summarized this basic architecture, reference will now be made to drawings that illustrate one possible structure of the functional units in a graphics processing system, and broadly to the manner in which the functional units intercommunicate to transfer data and cooperatively carry out their operating functions. In this regard, reference is made to FIG. 3, which illustrates a node 120 that may be used in a high-performance graphics processing system. As illustrated, such a node 120 may include an integrated geometry accelerator 122, rasterizer 124, and a cache 126. The general functional operation of the geometry accelerator 122, rasterizer 124, and cache 126 are similar to that of known systems.

Figure 4:
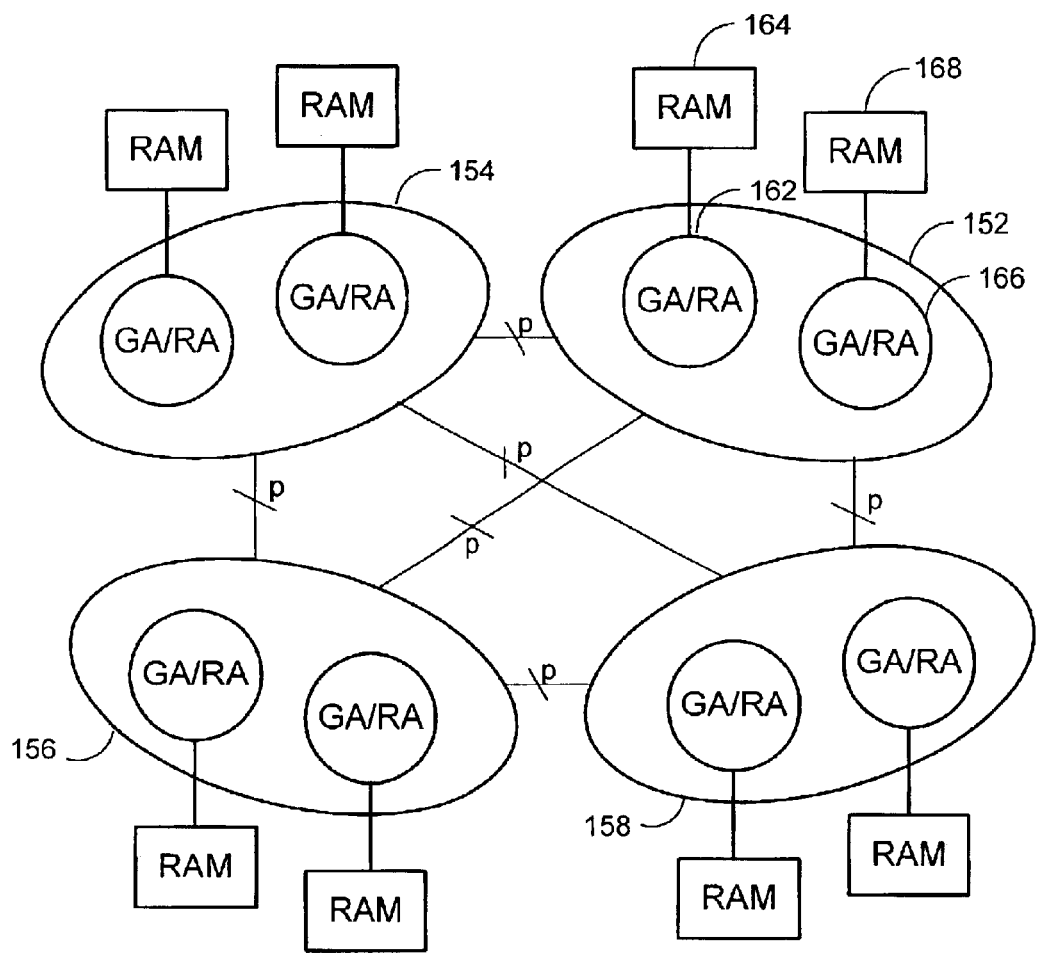
FIG. 4 is a diagram illustrating a nodal configuration in a multiple-chip architecture, in accordance with one embodiment of the invention.

Reference is now made to FIG. 4, which illustrates a plurality of nodes interconnected as they may be in a given graphic processing system. FIG. 4 illustrates that node development is largely independent of chip partitioning. Instead, chip integration and chip partitioning are guided by factors such as pin count, economy of integration, granularity of scalability, etc. With regard to the granularity of scalability, it will be appreciated that if there is one node per chip, then the system may be scaled one node at a time. If, however, there are four nodes per chip, then the system is preferably scaled four nodes at a time. In the figure, four chips 152, 154, 156, and 158 are depicted. Each chip includes two nodes. For example, chip 152 includes nodes 162 and 166. Node 162 communicates with RAM 164, and node 166 communicates with RAM 168. Thus, such an embodiment is scalable by increments of two nodes.

FIG. 4 also depicts the RAM elements 164 and 168 as being separate from the chip 152. In one embodiment, there may be a separate, dedicated RAM device per node. Such an approach provides for a finer granularity, yields better efficiency, and reduces the complexity of the design of internal functions. In another embodiment, however, a single RAM device may be utilized. The single RAM device of such an embodiment may be partitioned, however, such that individual partitions are allocated to the individual nodes. The design determination as to whether to allocate single memory devices or merely a partition of a memory device to individual nodes may be based upon various design-specific considerations, such as bandwidth requirements. In yet another embodiment, the RAM may be embedded onto the same chip as the connected node.

As is further illustrated in FIG. 4, each node is connected to other nodes through a plurality (p) of serial links. As previously described, the number of serial links that interconnect the various nodes will be guided by bandwidth requirements, and may therefore vary from system to system. In a given graphics system, a number of geometry accelerator/rasterizer (GA/RA) nodes may be provided to enhance the performance gained by the parallelism of these functions. In some nodes, these functions, or at least a portion of these functions, may be grouped with other functions.

Figure 5:
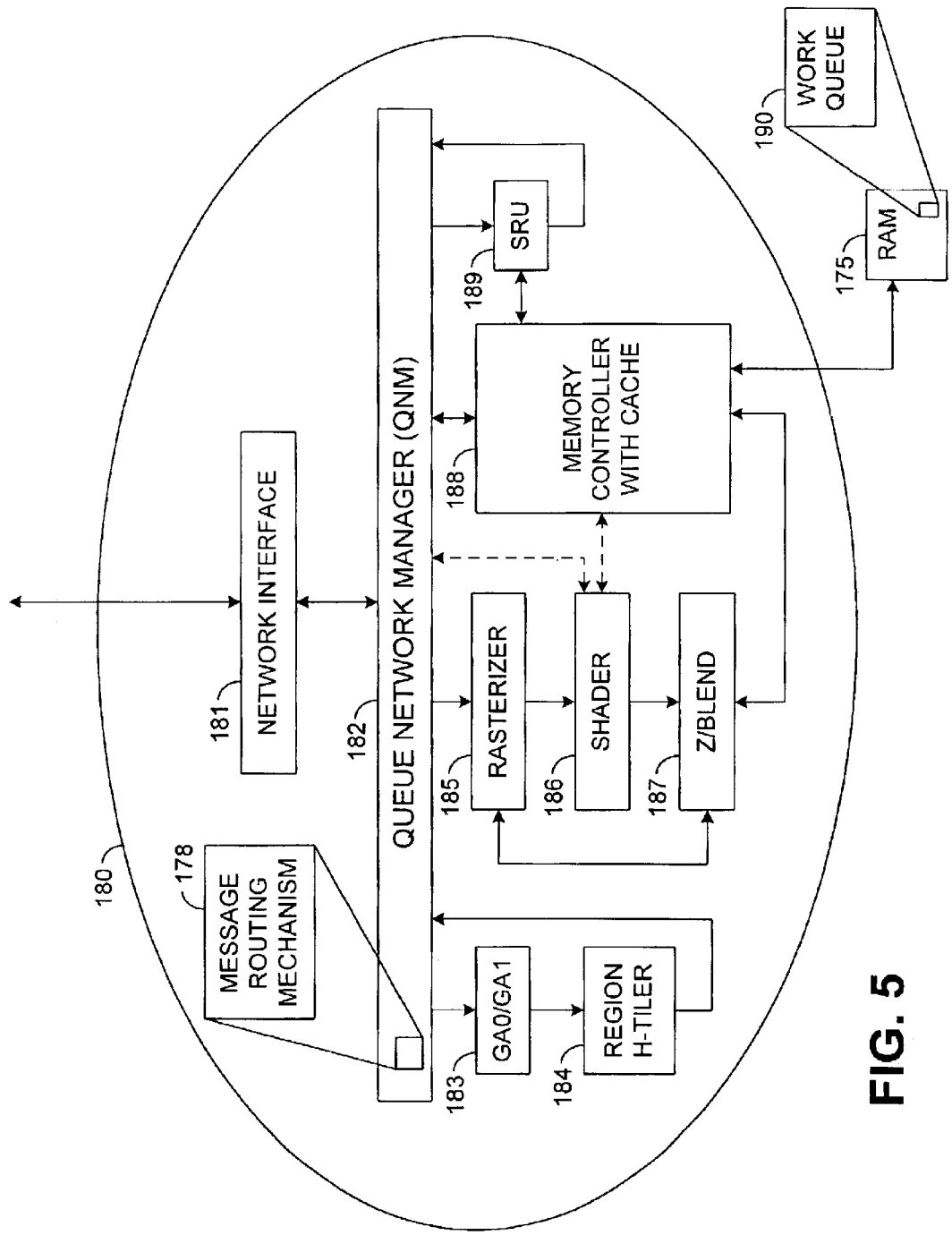
FIG. 5 is a diagram illustrating various functional elements, which may be embodied in a single node of one embodiment of the invention.

Reference is now made to FIG. 5, which illustrates a node of a preferred embodiment in more detail. In this illustration, a node 180 may more particularly include a geometry accelerator 183 with a hierarchical tiler 184, which together provide for accurate region selection. A hierarchical rasterizer 185, shader 186, and z/blend 187 elements having parametric interpolation allow for simplified hardware to interpolate many parameters. Preferably, shader 186 supports parametric texturing and z/blend 187 supports z test.

Also provided is a memory controller 188 with an on-board cache, for managing the RAM 175 that is local to the node 180. A screen refresh unit (SRU) 189 is also illustrated. The SRU 189 includes display composition functions and operates to compose RGB values to the screen. The general function and operation of the above-summarized components 184, 185, 186, and 187 is generally known and should be understood by people skilled in the art.

FIG. 5 also illustrates a network interface 181 and a queue network manager (QNM) 182. The QNM 182 is a processor that is programmed to operate on work queues (described below), and also to direct the flow of data and instructions into the functional unit(s) of the node 180. As will be discussed below, the programmability of the QNM 182 enhances the versatility of a system constructed in accordance with the invention.

The network interface 181 is simply the circuitry that interfaces the node 180 to the multiple serial links that interconnect other nodes in the network of nodes. The QNM 182 is designed to interface the different nodes/functional units together through the use of work queues 190 (which will be described below). In this regard, the QNM 182 segments and collates work queues 190 for direction to parallel functional units. The identity of a packet arriving upon a particular serial link associate that packet with a particular logical work queue 190. Work queues 190 are stored in the local RAM 175, and the QNM 182 is preferably designed to support multiple threads. The partitioning of resources among the threads is determined by the programmers for a particular application.

Finally, FIG. 5 illustrates a routing mechanism 178 that is a part of the QNM 182. The routing mechanism 178 is responsible for the routing of messages to the various nodes. As will be described in more detail below, each message includes an identification of the destination node that the message is destined for. Established routing technology and algorithms may be implemented within the routing mechanism 178 for redirecting and forwarding messages that arrive at intervening nodes. Because such routing algorithms are known, they need not be described herein.

The foregoing description of the elements of FIG. 5 has been intended to provide only a high-level illustration of one potential node design in a graphics processing system. The present invention, however, is not limited by, or dependent upon, a particular node design. Furthermore, persons skilled in the graphics processing art will appreciate and understand the operation of the elements generally described in connection with FIG. 5.

Figure 6:
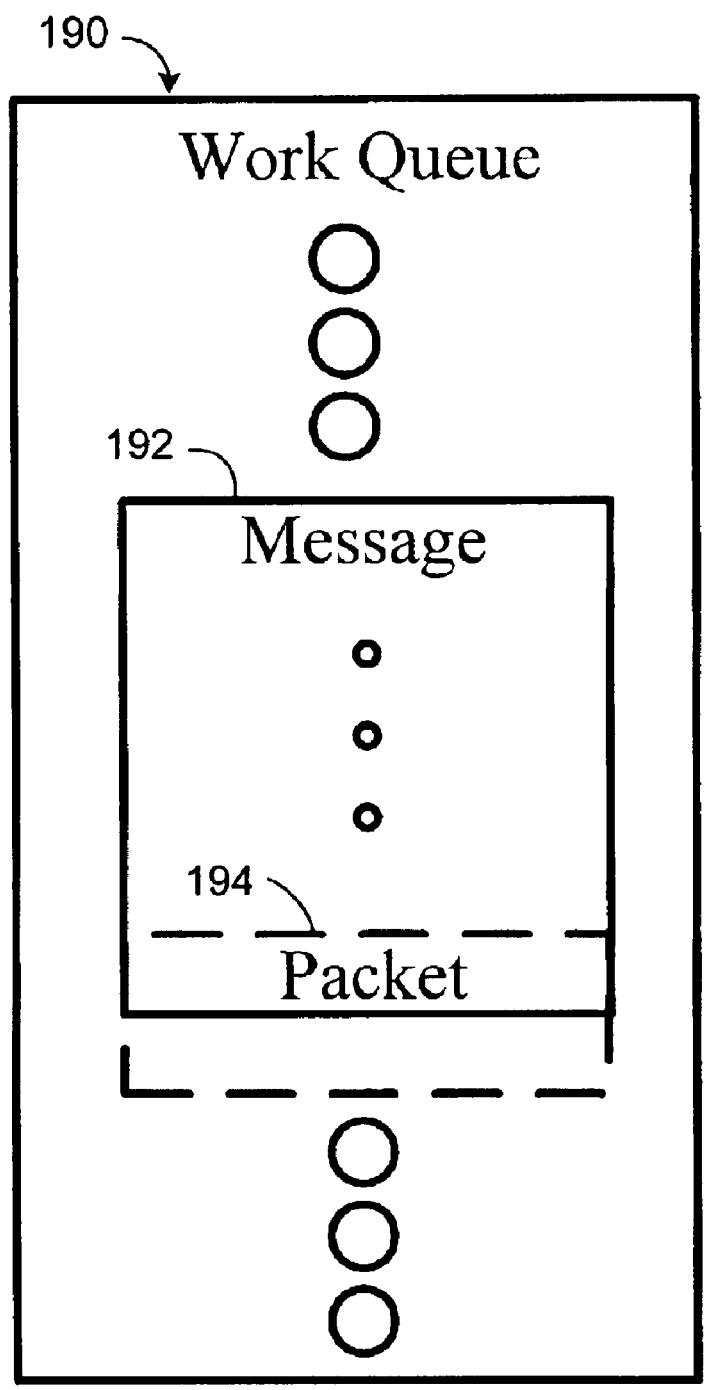
FIG. 6 is a block diagram illustrating a work queue, which is used for controlling the operation of a functional unit.

Reference is now made to FIG. 6, which is a block diagram illustrating a work queue 190, used to control the functional operation of various nodes. In essence, a work queue is a logical FIFO. For a first node to effect the operation of a second node, the first node produces a message or sequence of messages that are communicated to the second node, and placed in its work queue 190. The second node later carries out the operation requested or specified by the first node, when the second node processes that message within its work queue. In this regard, a work queue 190 includes a plurality of messages 192. Generally, a message is a command or instruction for a functional unit that is on the node. A data packet 194 is also illustrated. A data packet is a mechanism used to communicate a message, and is the smallest amount of data communicated across the communication links.

Although there are a variety of forms that work queues 190 and messages may take, consistent with the scope and spirit of the preferred embodiment, the form of these work queues and messages of a preferred embodiment is more fully set forth in Tables 1 through 6 below.

Table 1, below, illustrates the work queue message format for a message in accordance with one embodiment of the invention. As illustrated by Table 1 and Table 2 below, messages may generally be provided in one of two basic formats. The first format (defined by setting bit 31 to a 0) allows 1 to 128 coherent words, with the first including the data word count and identifiers of the message content. The second format (defined by setting bit 31 to a 1) is two words in length, and supports Direct Draw accesses of two-dimensional (2D) surfaces one pixel at a time.

TABLE 1

| MSB | Work Queue Message | | | | | | | | | | | | | | | | | | | | | | | | | | | | | | LSB |
|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | rw | Data Count | | | | | | | | | Type | | | | | Command | | | | | | | | | | | | | | | |
| Data[1] | | | | | | | | | | | | | | | | | | | | | | | | | | | | | | | |
| ... | | | | | | | | | | | | | | | | | | | | | | | | | | | | | | | |
| Data[DataCount] | | | | | | | | | | | | | | | | | | | | | | | | | | | | | | | |
| 1 | rw | Byte Enable | | | | | | UaddressY | | | | | | | | | | UAddressX | | | | | | | | | | | | | |
| Data | | | | | | | | | | | | | | | | | | | | | | | | | | | | | | | |

Table 2, below, defines the general operation or content of the message fields of Table 1.

TABLE 2

| Field | Bits | Function |
|---|---|---|
| Pc | 31 | Distinguish messages into two flavors: 1-Pixel Exactly 1 pixel data word accompanies the message. 0-Command Allows DataCount words to accompany a message. |
| rw | 30 | Read-Write select. 0-Write; 1-Read. |
| Data Count | 29:23 | Specifies [0..127] inclusive data words to accompany a buffered message. |
| Type | 22:20 | Selects 1-of-8 message types, four of which are described independently. 0-State 5-Geometry Vertex 7-QNM 2-4-Reserved 6-Rasterizer Vertex |
| Command | 19:0 | Selects operators and physical registers within the space specified by Type. |

TABLE 2-continued

| Field | Bits | Function |
|---|---|---|
| UaddressX\|Y | 23:0 | Extended unbuffered address space allows access to 8K×2K Direct Draw surfaces. |
| Byte Enable | 29:26 | Byte Enables; 1 enables change, correspond to [31:24], [23:16], [15:8][7:0]. |
| Data | 31:0 | Context dependent data. |

As shown in Table 1, three bits define the type of message. As shown in Table 2, when the value of these three bits is zero, the message is a "State" type message. The State type message may be used by functional unit types to access internal registers of functional units. The structure and format of a "State" type message is presented in Table 3 below.

TABLE 3

| MSB | State Message | | | | | | | | | | | | | | | | | | | | | | | | | | | | | | | LSB |
|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 |
| 0 | rw | Data Count | | | | | | | 0 | | | | Category Select | | | | Register Select | | | | | | | | | | | | | | |
| Data | | | | | | | | | | | | | | | | | | | | | | | | | | | | | | | |

As shown in Table 3, there are various fields defined within a State type message. The operation or content of these fields is defined below in Table 4.

TABLE 4

| Field | Bits | Function |
|---|---|---|
| rw | 30 | Read-Write select. 0-Write; 1-Read. |
| Data Count | 29:23 | Specifies [0..127] inclusive data words to accompany a buffered message. |
| Category Select | 19:15 | Selects a category of registers to access. 0x00-Video Display  0x08-Rasterizer  0x12-Host Interface 0x04-Geometry  0x09-Frame Buffer  0x13-BINC 0x07-Shader  0x10-Shared  0x15-DMA |
| Register Select | 14:0 | Selects a register to access within the category. |
| Data | 31:0 | Context dependent data. |

Work queue messages directed to the QNM 182 are parsed and interpreted by the work queue routines executing within the QNM 182 file address space. Those routines are free to examine all messages for content that may affect QNM 182 behavior. Preferably, one message type is reserved for the sole use of the QNM 182. This message type is referred to as a QGO message (Table 5 shows the message structure for a QGO message), which the work queue interpreter (see FIG. 10) uses to change its point of execution to the register file location indicated in the message. This provides a compact and efficient way to effect a complex operation within the QNM. The message list at that location may well effect a return to the work queue interpreter.

Utilization of additional data words included with the QGO is a function of the routine called. Additionally, work queue responders can further pad the data count to accommodate packet framing on the network of serial links. point serial links. The serial links establish a medium for originator nodes to request packets of data to be returned from the local storage space of responder nodes on the network. The local storage space may be a physical RAM or a virtual representation of that RAM, such as caches and queues. Nodes without a direct link are routed by the QNM via intermediate nodes. In the preferred embodiment, writes to the local memory space of a remote node are not permitted. Instead, resources and work are distributed such that only writes to the local space of a node are employed.

To illustrate how work may or data may be distributed among nodes of a system, consider the SRU 189. The SRU is a continuous process that is not driven by work queues, except to modify its modality (display resolution, front buffer selection, etc). The process of composition is partitioned based on the spatial locality of the image surface representing the display. This process can access multiple image surfaces, independent of their own spatial locality.

TABLE 5

| MSB | QGO Message | | | | | | | | | | | | | | | | | | | | | | | | | | | | | | | LSB |
|---|---|---|---|---|---|---|---|---|---|---|---|---|---|---|---|---|---|---|---|---|---|---|---|---|---|---|---|---|---|---|---|---|
| 31 | 30 | 29 | 28 | 27 | 26 | 25 | 24 | 23 | 22 | 21 | 20 | 19 | 18 | 17 | 16 | 15 | 14 | 13 | 12 | 11 | 10 | 9 | 8 | 7 | 6 | 5 | 4 | 3 | 2 | 1 | 0 | |
| 0 | 0 | Data Count | | | | | | | 7 | | | | | Ind | | Register File Address | | | | | | | | | | | | | | | | |

As shown in Table 5, there are various fields defined within a QGO type message. The operation or content of certain of these fields is defined below in Table 6.

TABLE 6

| Field | Bits | Function |
|---|---|---|
| Register File Address | 15:0 | Specifies a word location within the 64K-address space of storage local to the QNM. The resolved address is the beginning of a list of QNM messages. |
| Ind | 18 | Indirect resolution via the value contained at the specified register file address. |

Indirect addressing can provide isolation between producers and consumers via a pointer. A QGO message has the ability to synthesize new message types for functional units receiving messages. The QNM 182 can use the QGO message to insert new messages into the work queue interpreter. Since the QGO message is a pointer into some subroutine, it may be used by a programmer to create new commands that are not predefined in a given functional unit.

Within the QNM's register file, another set of messages may be used to implement the behavior of the QNM 182. A buffered work queue QGO message may also be a valid QNM message. The QNM 182 may have read access to all nodes' local storage via the network of serial links, and read/write access to the local storage 175 of its own node 180. It may be allocated a portion of that storage to use at its discretion and may be explicitly directed by subroutine messages to load/store specified information to/from the local storage 175.

The QNM 182 may also manage a large number of queue and stack structures that are highly dynamic. Due to the number of structures, reserving a fixed portion of register file space for each is undesirable. Also, the dynamics of interactions between functional units is expected to shift the structures that contain the most data at any given instant. Therefore, mechanisms to support dynamic allocation of storage may be included.

Having described the high-level structure and operation of the basic elements of a graphics system constructed in accordance with the teachings of the invention, it should be appreciated that the system has a novel architecture, where functional units contained within nodes, such as a texture mapper and a geometry accelerator, communicate via a router based network, comprised of nodes with point-to-182

Surfaces aligned with the display may have the same spatial locality. The process of updating the display is local to the location of the display driver. In this regard, it is preferred that there be only a single driver for the display. This avoids issues with alignment of pixels on the actual display. The display update process will access composed images from the appropriate nodes.

With regard to the geometry accelerators, work may be distributed among the various geometry accelerators in a system in a way that seeks to maintain a balanced work load among the various geometry accelerators. As is known, the data that is operated on by the geometry accelerators is in user coordinates, as opposed to screen coordinates. Therefore, it is preferable to not divide work among the geometry accelerators based upon spatial locality. However, it can be divided up based upon load balance.

In this regard, the various geometry engines will generally poll their respective work queues from the host interface QNM, as they become idle or need work. The host interface QNM can monitor this polling activity to determine which geometry accelerators are less busy, and can allot additional primitives to those geometry accelerators. In this way, the host interface QNM can distribute work among the various geometry accelerators in a way that most efficiently balances the work load. As discussed further herein, this work may be distributed in a "round-robin" fashion, or in other ways, so long as the ordering of the work is maintained.

With regard to the rasterizers, after the work is performed by the geometry accelerators, work can be distributed based upon spatial locality. That is, after the geometry accelerators have completed their work on the data, the data has been projected into screen space. With a screen space projection of the work, the hierarchical tiler 184 can determine which rasterizers are associated with particular areas of the display (screen space) and work may be appropriately directed to rasterizers based upon that screen space projection.

With regard to texture-mapping, after computation of texture parameters to the pixel or even sub-pixel level, the spatial locality of individual texels can be determined. In general, there is no correlation of the texture's spatial locality with that of the image's.

Work is preferably distributed to the node indicated by image spatial locality, pipeline parameters through more traditional FIFO (first-in first-out) storage means, and to provide texture-mapping with the facility to read texel samples independent of spatial locality.

For a functional unit to effect a sequence of actions in another unit, sequences of messages are produced, which are written into the local storage space of the effector node. In the preferred embodiment, and as described above, a message is a series of thirty-two bit words composed of a command word followed by data words used to perform the indicated action. An affected functional unit consumes the sequence from an agreed-upon location, interpreting messages as intended. A sequence of messages is referred to as a work queue, which has also been described above. Functional units consume work queues on their inputs and produce work queues on their outputs. In this respect, a producer node will produce a work queue into its own local memory space. In contrast, a consumer node will pull data, instructions, or other information (as it needs it) from the producer's memory. In this way, coherency is maintained in a simplified manner. It should be appreciated that if a consumer requests data or information that is not yet ready, the data or information will not be returned to the consumer (until the data or information has been produced by the producer), thereby stalling the consumer.

The effector and affected functional units need not reside in the same physical node. A programmable pointer specifies space for a queue in the local storage space of an explicit node, allowing producers and consumers to be disjoint. Independently specifying the producer and consumer pointers enhances scalability by allowing a new functional unit to be inserted without the knowledge of the old units. Functional units access queues via a FIFO-like interface, with management of node storage addresses performed by a QNM.

By way of example, the execution of a message by a functional unit may require information not explicitly provided in the work queue. For instance, an action may be to render a triangle primitive with an applied texture or to sequence the information representing an image through a DAC. The required information is directly requested by the functional unit via its dedicated interface to its node's memory subsystem interface or via a dedicated port to the QNM 182. For example, the shader 186 of FIG. 5 may directly communicate with the memory controller 188, or alternatively may communicate through a dedicated port to the QNM 182, such that the QNM 182 may determine whether data to/from the shader 186 is local or remote. The memory subsystem determines which node's local storage contains the information, originating a request on its interface to the network if on a remote node, or originates access to its own local storage interface if not on a remote node. Multiple requests may be originated to compensate for the latency of responses returning.

Giving QNMs the ability to change queue pointers effects flow control in the work queue paradigm. For instance, it may be desirable to source a consumer work queue from a sequence of producers. Augmenting the abilities of the QNM with a message class for accessing routines stored in a register file contained within the QNM can create a wide variety of useful behaviors, such as "round-robin" sequencing of a class of units (such as sequencing the outputs of a plurality of geometry accelerators, in the example presented below), or save and/or restore context to local storage space. Moreover, all behaviors of the QNM are determined by routines that transfer and interpret the contents of message queues, which as a result may access higher level routines. The exact behavior to be expected is preferably determined by the implementation programmed into the QNM.

Figure 7:
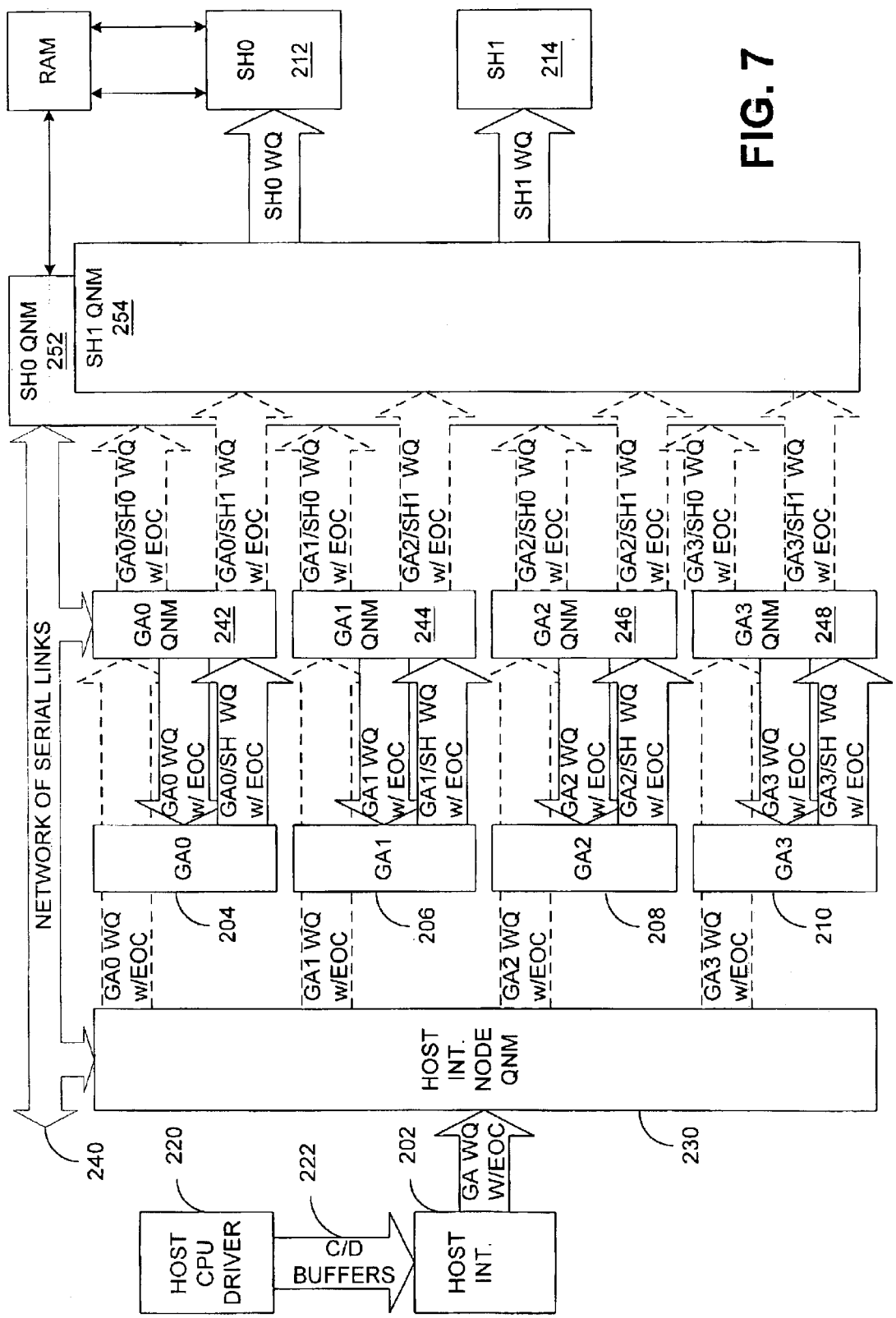
FIG. 7 is a diagram illustrating an examplar work queue flow through a nodal graphics system having four parallel geometry accelerators and two shaders.

To provide a simple illustration of the usage of this paradigm, reference is made briefly to FIG. 7, which illustrates the concept of functional units communicating via work queues. Specifically, FIG. 7 illustrates a host interface 202, four geometry accelerators (GAs) 204, 206, 208, and 210, and two shaders 212 and 214 (which need not reside on the same physical node). The device driver 220 on the host writes the I/O bus with messages 222 in the form of command/data buffers, which the host interface 202 translates to work queue messages, written to the host interface QNM 230. In the illustrated embodiment, after every fourth complete drawing primitive, the host interface QNM 230 synthesizes an End-Of-Chunk (EOC) message to effect load balancing. An EOC message is a QGO message (described above) that effects an end-of-chunk (discuss further herein).

It should be appreciated that the dashed line arrows represent logical communications between devices. Actual communications between such devices are preferably not direct, but rather occur over the network of serial links and through the QNMs of the respective nodes.

The QNM 230 executes a message list initiated after power-up that parses the work queue (in the memory local to the QNM), distributes state messages to all geometry accelerator work queues, and distributes work messages to a single geometry accelerator work queue, up to the next EOC. This EOC invokes a subroutine message list that may choose the next geometry accelerator from a "round-robin" sequence, and synthesizes a shader EOC into the active geometry accelerator work queue. Each geometry accelerator 204, 206, 208, and 210 consumes its work queue and produces a work queue for shaders 212 and 214. Messages that are not directly executable by a geometry accelerator are propagated to its output, while others denote drawing primitives that result in the synthesis of new shader messages. The QNM also executes another message list initiated after power-up that parses the shader work queue, distributes state messages to all shader work queues, and distributes work messages to each shader work queue as indicated by spatial information contained in the messages.

As illustrated, communication with the network 240 is performed by the various QNMs. For example, the host interface QNM 230 communicates the work queue messages for the geometry accelerators 204, 206, 208, and 210 to the network 240. These work queue messages are received from the network 240 by the respective QNMs 242, 244, 246, and 248 for the geometry accelerators 204, 206, 208, and 210.

Conceptually, any number of functional units can reside in a node, each of which independently produces and consumes its own work queues. The actual number of functional units present in a given node dictates the resources required within the QNM and contributes to bandwidth consumption on the network. The bandwidth in/out will preferably not exceed the available bandwidth on a node's portion of the network, effectively capping the complexity of the QNM, even though additional producers and consumers may be served. A heterogeneous set of node classes allows anisotropic distribution of functional unit types and eases introduction of new types of functional units to the network, thus enhancing scalability.

Multiple functional units can work concurrently without deadlock because each functional unit's communication sequence order is maintained independently of other functional units. Preferably, the granularity of communication on the network 240 is fine enough that no functional unit can significantly delay another functional unit from accessing the network. Instead, only the particular functional unit that originated a given request for an unavailable packet is stalled. Other sequences independently continue along the network 240. Work queues are structured to come to an end, without indefinitely stranding an origination without a response. Queues utilizing mechanisms, such as the EOC above, include routines in the producer and consumer QNMs to prevent origination of requests beyond the logical end of or transitions between queues by looking ahead and inserting a QNM message that serves to warn of the upcoming EOC.

Synchronizing operations between functional units is also realizable with the queue concept. Each unit to be synchronized produces a short queue that is simply a return. In this context, a return may be simply a contentless packet retrieved from the designated address, and there may be no interpretation or execution of the returned value. A single designated unit jumps to consume each queue in turn. When it successfully retrieves the last queue, it produces queues for each unit. Production is essentially completed at the same time, enabling each functional unit to complete its consumption, continuing their work queues in near synchrony.

With regard to work queue production, a sequence of messages produced in one functional unit can be partitioned into sequences to be consumed by multiple units. The sequence may contain portions to be duplicated for all target units (state) and portions that are to be processed by a subset of the target units (work). The state portion may be further divided into portions that are optimizable (earlier writes of the same message may be removed) and those that are not. The target for the work portion can be predetermined by its contents or can be dynamically determined by first available, with intermediate units in "round-robin" sequence receiving empty work portions.

Whenever an optimizable state is found in a sequence to be partitioned, it is saved as the active state and all functional units are marked. Messages for manipulation of register file words as bit arrays facilitate these actions. Whenever work is to be placed in a target work queue, all of the marked active states are first placed in the work queue. In this way, a functional unit with work will have the active state without receiving all state transitions between work messages.

Furthermore, it is possible to identify sequences that can be made more efficient for the producer, consumer, and/or the network 240 bandwidth by introducing QNM messages that manipulate work messages at an appropriate functional unit input or output. For example, if a plurality of successive messages were used to communicate different portions of vertex data (e.g, coordinates and values for X, Y, Z, R, G, B, Alpha, S, T, etc.) to a node, a single message package could be constructed to send all of this data in a single packet. This would reduce the amount of "header" information that is communicated in the multiple messages.

Figure 8:
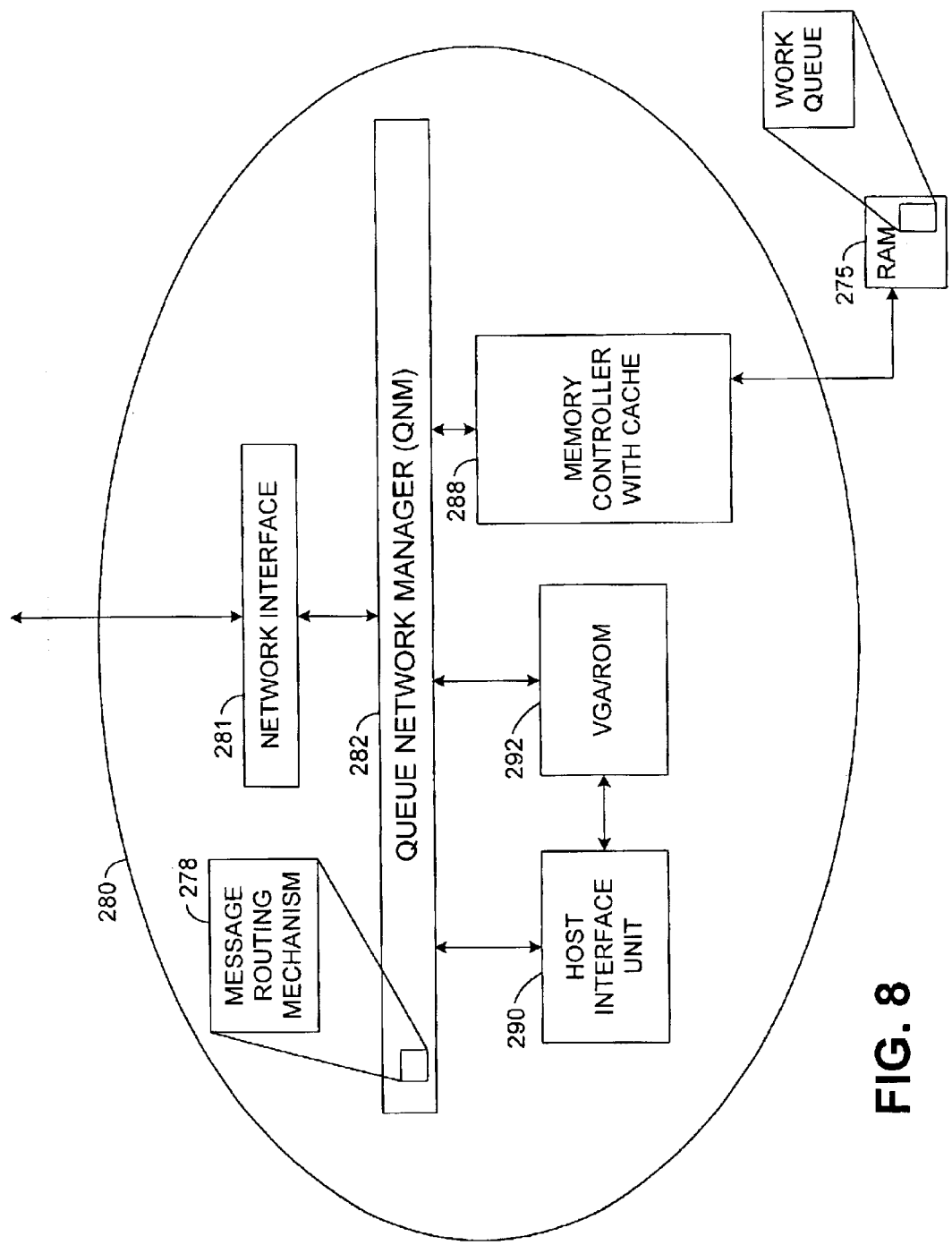
FIG. 8 is a diagram illustrating a node similar to the node of FIG. 5, but having differing functional units.

Reference is now made briefly to FIG. 8, which illustrates a node 280 similar to the node 180 of FIG. 5, but having differing functional units. In this respect, FIG. 5 illustrated a node 180 for carrying out certain graphics processing functions in a computer graphics system. Like the node of FIG. 5, the node 280 illustrated in FIG. 8 comprises a network interface 281, a QNM 282, a memory controller 288, a message routing mechanism 278, and a dedicated RAM 275. The node 280 also illustrates a host interface unit 290 and a VGA/ROM 292.

This node 280, or one like it, operates to coordinate initialization and communication of other nodes with the host computer. The functional unit 290 serves as a host interface and operates to communicate with the host. Upon startup, other nodes in the system may communicate with node 290 to receive instruction. That is, upon startup, other nodes (consumers) may read from the host interface 290 to obtain their setup and configuration information. During this early communication, the other nodes may be instructed as to where they are to read their work queues.

The block labeled as VGA/ROM 292 may communicate with both the QNM 282 and communicating with the graphics BIOS (basic input output service), before the graphics system and driver of the present invention assume control of the display. The particular manner in which initialization and communications with the host occur through node 290 are not limiting upon the present invention, and could be implemented by persons skilled in the art.

One aspect of the preferred embodiment may be viewed as a distributed shared memory. Shared or unified memory systems are well-known, wherein a memory system is shared by multiple subsystems or functional/processing units. Distributed memory systems are also known, wherein memory is distributed for use among various functional/processing units. The distributed shared memory aspect mentioned above capitalizes on benefits from both shared and distributed approaches. First, it provides certain benefits from distributed memory systems, such as distributed bandwidth (avoiding memory bandwidth bottlenecks). At the same time, it allows sharing of memory resources, thereby avoiding the replication of data among multiple memory devices. In the preferred embodiment, access to the memory devices is limited, such that write access to a memory device may be performed only by functional units of the associated node. However, read access is permitted to all nodes, thereby obviating the need to implement a complex coherency scheme.

Figure 9:
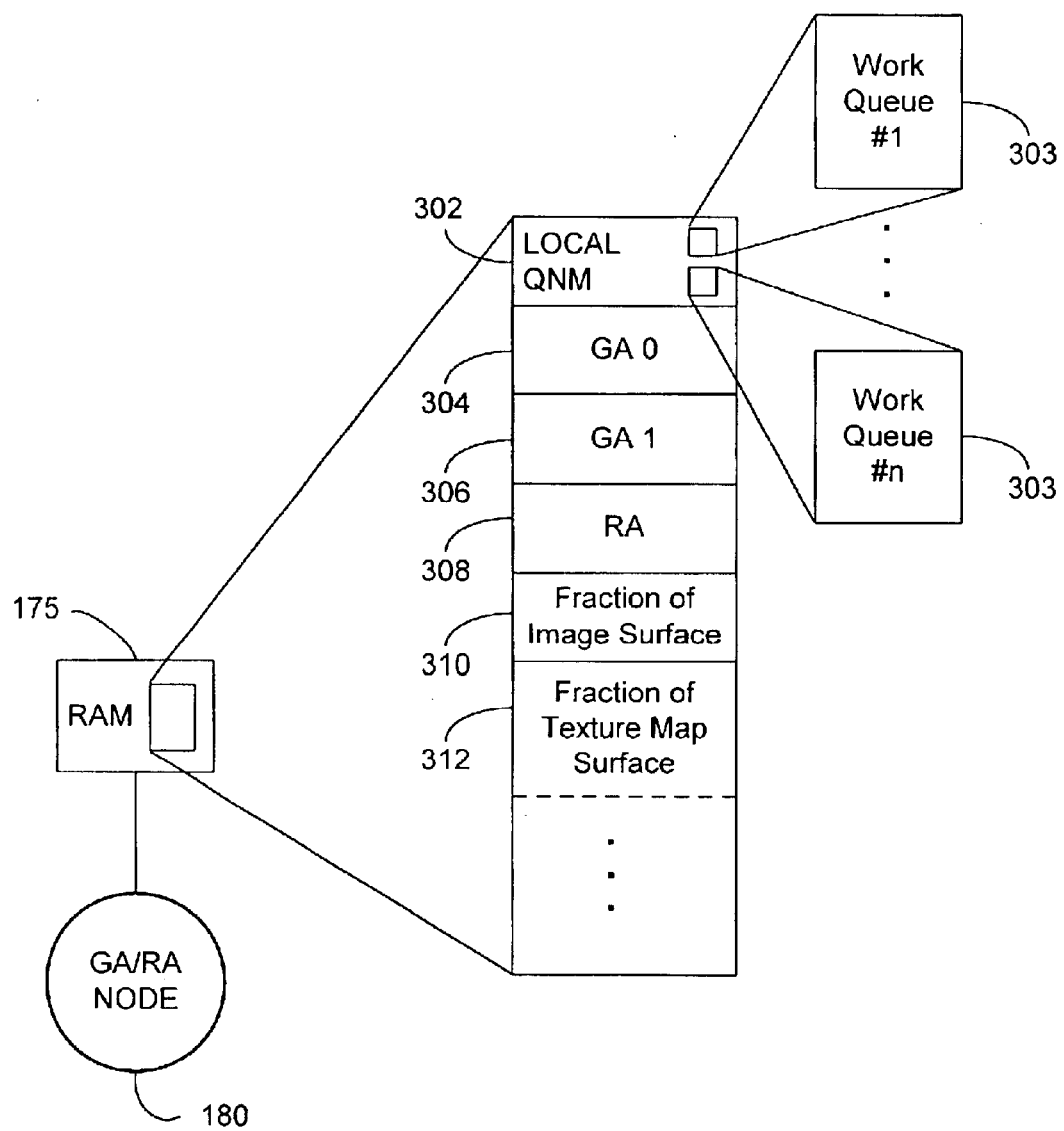
FIG. 9 is a diagram illustrating one example of a potential memory segmentation scheme that may be employed by a graphics node like the one illustrated in FIG. 5.

Reference is now made to FIG. 9, which illustrates one example of a potential memory segmentation scheme that may be employed by a graphics node like the one illustrated in FIG. 5. It should be appreciated, however, that numerous other segmentation schemes may be employed consistent with the scope and spirit of the present invention. In the embodiment illustrated in FIG. 9, a memory 175 that is local to a node 180 for carrying out a graphics processing function may include a number of dedicated segments. One segment 302 is dedicated to the QNM 182 (FIG. 5) of the local node 180. Among other data and information that may be stored in the space, this dedicated memory space 302 may include a plurality of work queues 303. In this respect, the QNM 182 acts as a producer node producing work queues for consuming nodes. In conjunction, consuming nodes may read from these work queues 303.

Other memory segments of the memory 175 may include a segment 304 for a first geometry accelerator, a segment 306 for a second geometry accelerator, a segment 308 for a rasterizer, a segment 310 containing a fraction of an image surface, a segment 312 containing a fraction of the texture surface. With regard to the geometry accelerator and rasterizer segments, when these components act as "consumers," the memory segments need not store work queues (since only producer components require storage for work queues). The unified memory structure of the present invention allows texture surfaces to be partitioned and stored across multiple nodes. This is particularly unique insofar as texture surfaces do not readily map spatially to the image being displayed.

Accordingly, the system comprises a mechanism for modifying work queues based upon the segmentation of the memories of the various nodes. This mechanism differs depending upon the functional units associated with the memory segmentation. As previously discussed, the host interface may include a mechanism (not specifically illustrated) for distributing work among the geometry accelerators in a manner to effect load balancing among the geometry accelerators of the various nodes. Another mechanism (e.g., the hierarchical tiler 184) may be used to distribute work among the various rasterizers based upon spatial locality (e.g., memory segmentation).

In the illustrated embodiment (e.g., FIG. 5), memory devices are allocated and associated with nodes, wherein each node contains at least one functional unit for processing data. There are a number of advantages to such a system architecture, particularly in a computer graphics environment. Some of these advantages include providing a unified surface definition, enabling the sharing of textures without replication of the textures in multiple memories, enabling an image surface to define a texture, enabling distributed storage of display lists within a computer graphics card, enabling all geometry accelerators to have access to the display lists, scalability of texture bandwidth as the graphics system is scaled, and the support of large memory configurations. With regard to the support of large memory configurations, such configurations provide enhanced support for texture-mapping, anti-aliasing, and display list storage.

A display list is an efficient representation of graphics that may be stored local to the graphics hardware. The implementation and use of display lists are well-known, and were developed years ago, when the speed of the graphics hardware was faster than that of the host CPU. Evolutionally, CPU speed improved and the use and implementation of display lists began to decrease. However, the speed and power of graphics hardware is again outperforming that of most host CPUs, making the use and implementation of display lists more desirable. It should be appreciated that a distributed, shared memory structure of the present invention would make the implementation of a display list a trivial thing.

In accordance with one aspect of the preferred embodiment, a system and method are provided for passing messages among various functional nodes via a commonly accessible memory. In this respect, the term "message" is broadly construed. In one context, a message may simply contain information that is passed or shared. In another context, messages relate to work queues that may be consumed by a consumer functional unit. For example, work may be apportioned among a plurality of geometry accelerators of different nodes, each of which operates on a segment of a computer graphic. A geometry accelerator that is a producer "produces" its output to its own respective local memory. The QNM for a rasterizer, however, may retrieve the respective outputs of the plurality of geometry accelerators and form a work queue in the memory space of the node associated with the rasterizer, which work queue is to be consumed by the rasterizer.

In another context, the structure of the preferred embodiment facilitates or accommodates ready expansion of a system. As one example, assume that it is desired to add a functional unit that would be functionally inserted between the operations of the geometry accelerators and the rasterizers (such as a quadratic interpolator). A separate node may be added containing this functional unit. The QNM of this functional unit may retrieve the respective outputs of the plurality of geometry accelerators and form a work queue that is to be consumed by the new functional unit. The new functional unit may then produce its own output, which is retrieved and operated upon by the rasterizer(s). It will be appreciated that such a hardware expansion may be uniquely accommodated by the system without other hardware changes, but rather by simple software updates.

As discussed in connection with FIG. 6, for a first node to effect the operation of a second node, the first node produces a message or sequence of messages that are communicated to the second node, and placed in the second node's work queue 190. The second node later carries out the operation requested or specified by the first node, when the second node processes that message within its work queue. In this regard, a work queue 190 includes a plurality of messages 192. Generally, a message is a command or instruction for a functional unit that is on the node. A data packet 194 is also illustrated. A data packet is a mechanism that is used to communicate a message, and is the smallest amount of data communicated across the communication links.

Work queue messages directed to the QNM 182 are parsed and interpreted by the work queue routines executing within the QNM 182 file address space. Those routines may examine all messages for content that might affect QNM 182 behavior. As discussed above, a QGO message type is reserved for the sole use of the QNM 182. A work queue interpreter 440 (see FIG. 10) may use a QGO message to change its point of execution to a register file location indicated in the message. This provides a compact and efficient way to effect a complex operation within the QNM. The message list at that location may effect a return to the work queue interpreter.

Utilization of additional data words included with the QGO is a function of the routine called. Additionally, work queue responders can further pad the data count to accommodate packet framing on the network of serial links. As discussed previously, indirect addressing can provide isolation between producers and consumers via a pointer 430 (see FIG. 10).

Figure 10:
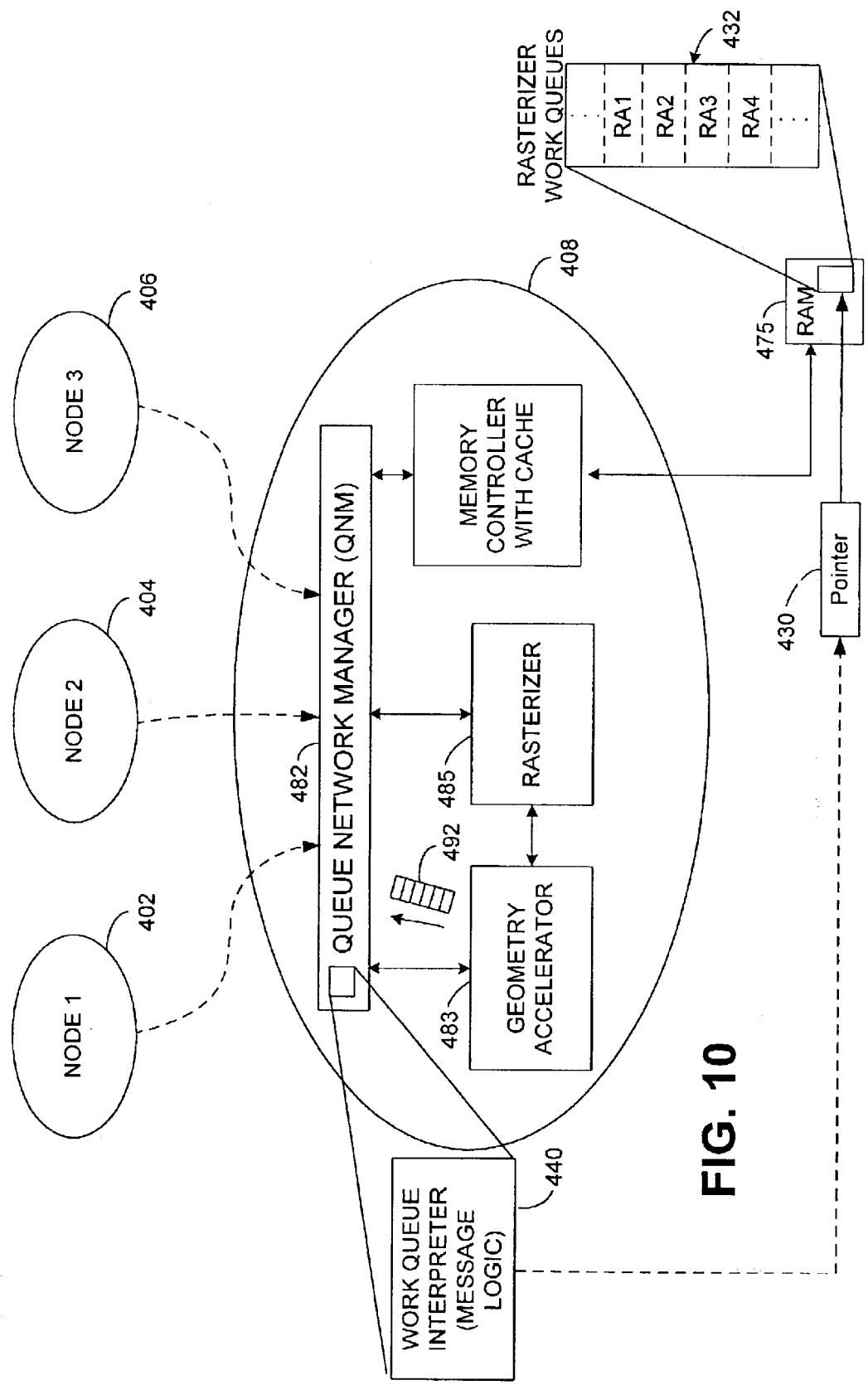
FIG. 10 is a diagram depicting a system having a plurality of nodes similar to the node of FIG. 5, and illustrating the concept of passing messages among nodes.

Although certain aspects of the message handling have been described above, these aspects will be further depicted with reference to FIG. 10, which is a diagram depicting a system 400 having a plurality of nodes 402, 404, 406, and 408. Of course, additional nodes (not shown) may also be present. For purposes of simplicity and illustration, assume that each of the nodes 402, 404, 406, and 408 includes the various functional units illustrated in connection with the node 180, illustrated in FIG. 5. Only a portion of these functional units have been illustrated in node 408, and none have been illustrated in nodes 402, 404, and 406. Upstream of the operation of the geometry accelerators and rasterizers, the stream of graphics data sent from the host will be analyzed and segmented among the various nodes 402, 404, 406, and 408 for processing by the geometry accelerators. Because each node writes only to its local memory, the output results of the geometry accelerators are saved to the RAMs in the respective nodes. The node 408 then retrieves the results of the various geometry accelerators in forming a work queue for the rasterizer 485. Of course, the rasterization process may be divided among various nodes. For simplicity, however, only one such rasterizer node is illustrated.

In a scenario like the one illustrated, where there may be four rasterizers, and the results from each geometry accelerator must be distributed to at least one of the rasterizers. As illustrated, a message 492 may be produced from geometry accelerator 483 and interpreted by work queue interpreter 440, which determines which rasterizers are required to process the message. By using a series of pointers 430, which may be stored in the local memory 475 (or elsewhere) and point to the data destination(s) for the rasterizer workqueues 432, the QNM 482 can readily construct the work queues 432 for the rasterizer 485 in node 408 and rasterizers in nodes 402, 404 and 406.

In the same way the QNM 482 may readily support the insertion of an additional functional unit into the system 400. As previously mentioned, by way of illustration, assume that it is desired to insert a new functional unit for performing an interpolation function. Further assume that this functional unit is to be functionally inserted between the geometry accelerators and the rasterizer(s). The use of a pointer-based system allows the ready insertion of additional functional units, as the pointers may be updated to reflect the source of the data generated by the inserted functional unit. The work queue interpreter 440 may also be used to facilitate this feature.

Figure 11:
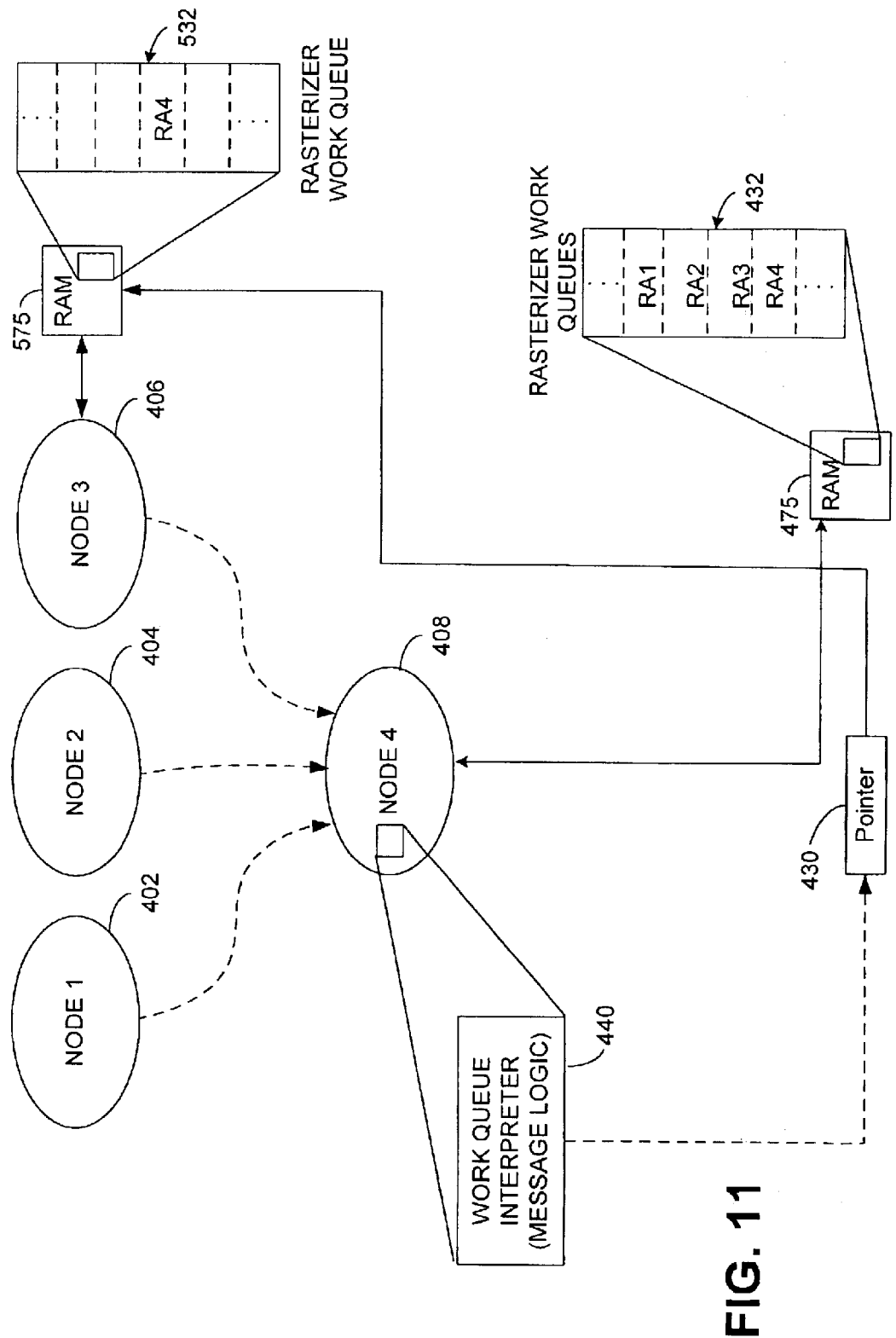
FIG. 11 is a diagram depicting a system having a plurality of nodes similar to the node of FIG. 5, and illustrating multiple work queues with different nodes.

Reference is made briefly to FIG. 11, which is a diagram similar to FIG. 10. However, internal components of node 408 have been omitted from the illustration. In addition, a work queue 532 associated with node 406 is illustrated. Specifically, assuming the rasterizer work queues 432 and 532 include, among other things, the content from the geometry accelerators of each of the nodes 406 and 408, as the rasterizer 485 (FIG. 10), is performing its computations (via message control), the work queue interpreter (or pointer logic) 440 will control the value of the pointer to point to work queue 432, work queue 532, or another work queue as needed to obtain the necessary information. In this regard, a consumer functional unit (e.g., rasterizer) may obtain data from remote nodes. Thus, the pointer need not point to a location within the local RAM 475, but may point to a location in a remote RAM 575.

As should be appreciated from the foregoing, in practice, a QNM working to supply work queues to a consumer would likely not wait until a message indicated to change its pointer to begin retrieving portions of work queues from its multiple producers. If it did, it could incur unnecessary latency to fill the pipeline from a new producer when a change occurred. Instead, the QNM can be configured to hide this latency because the pointer will change in a "round-robin" fashion. Even if the pointer change must be directed by the message, such as for a subroutine, an intelligent producer could foresee the change, send a message that foreshadows the value of the new pointer, and trigger a flow of control change at the appropriate point in the message stream.

Embodiments of the present invention are directed to a system and method for performing BLTs in a computer graphics environment. To illustrate a simple BLT operation, reference is made to FIG. 12, which illustrates a visual display 610 (such as computer monitor) having a window 620 therein. As is known, windowing programs enable, for example, a user to move a window from a source location 620 to a destination location 630 (source and destination windows are designated by the letters "S" and "D," denoted in the upper left-hand corner of the windows). This operation may be performed by, for example, a user using a mouse to drag the window from the source location 620 to the destination location 630. In accordance with this move operation, all pixels from the source window 620 are copied to the destination window 630. This is illustrated by dash lines 625.

As is known, each pixel within a graphics window is represented by a numerical value that is stored in memory within a computer system. Pixels that appear on a visual display are stored, among other possible places, in a frame buffer on a graphics card. In the context of the operation illustrated in FIG. 12, the BLT of the source window 620 to the destination window 630 is performed on the data stored in the corresponding frame buffer memory locations to move the data from the memory locations corresponding to the source window to the memory locations corresponding to the destination window.

Figure 12:
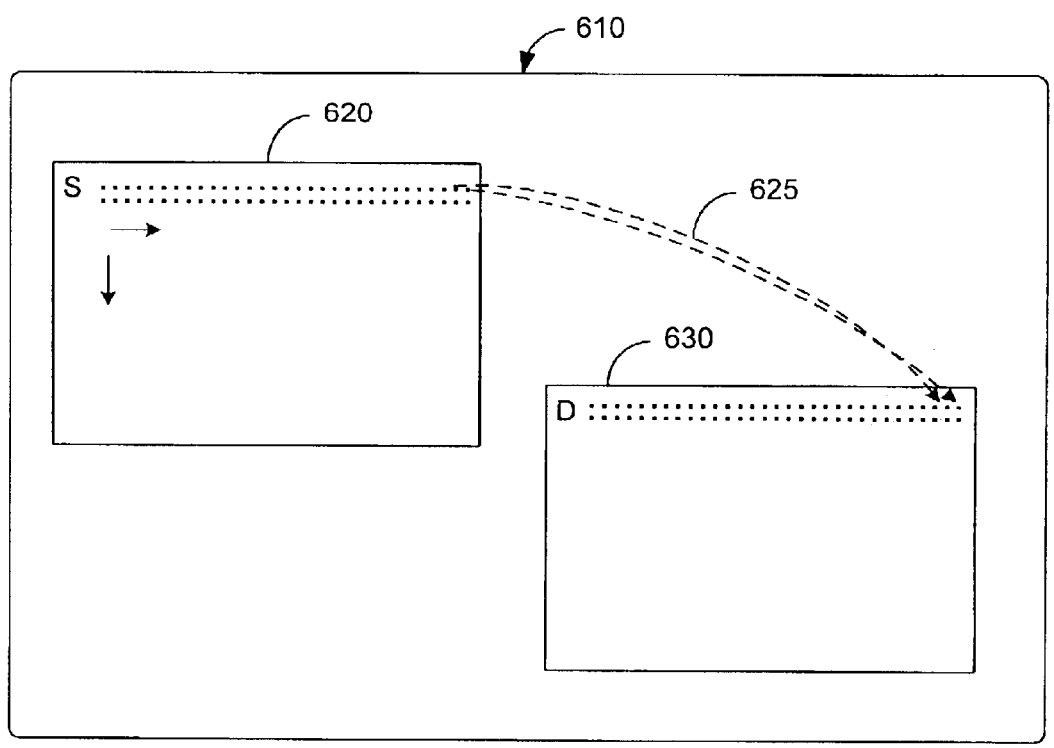
FIG. 12 is a diagram illustrating a BLT operation on a graphics display.

In the example illustrated in FIG. 12, this is a fairly simple and straight-forward operation. However, a number of situations arise that add complications to this process; for example, when the source and destination window locations overlap.

Figure 13:
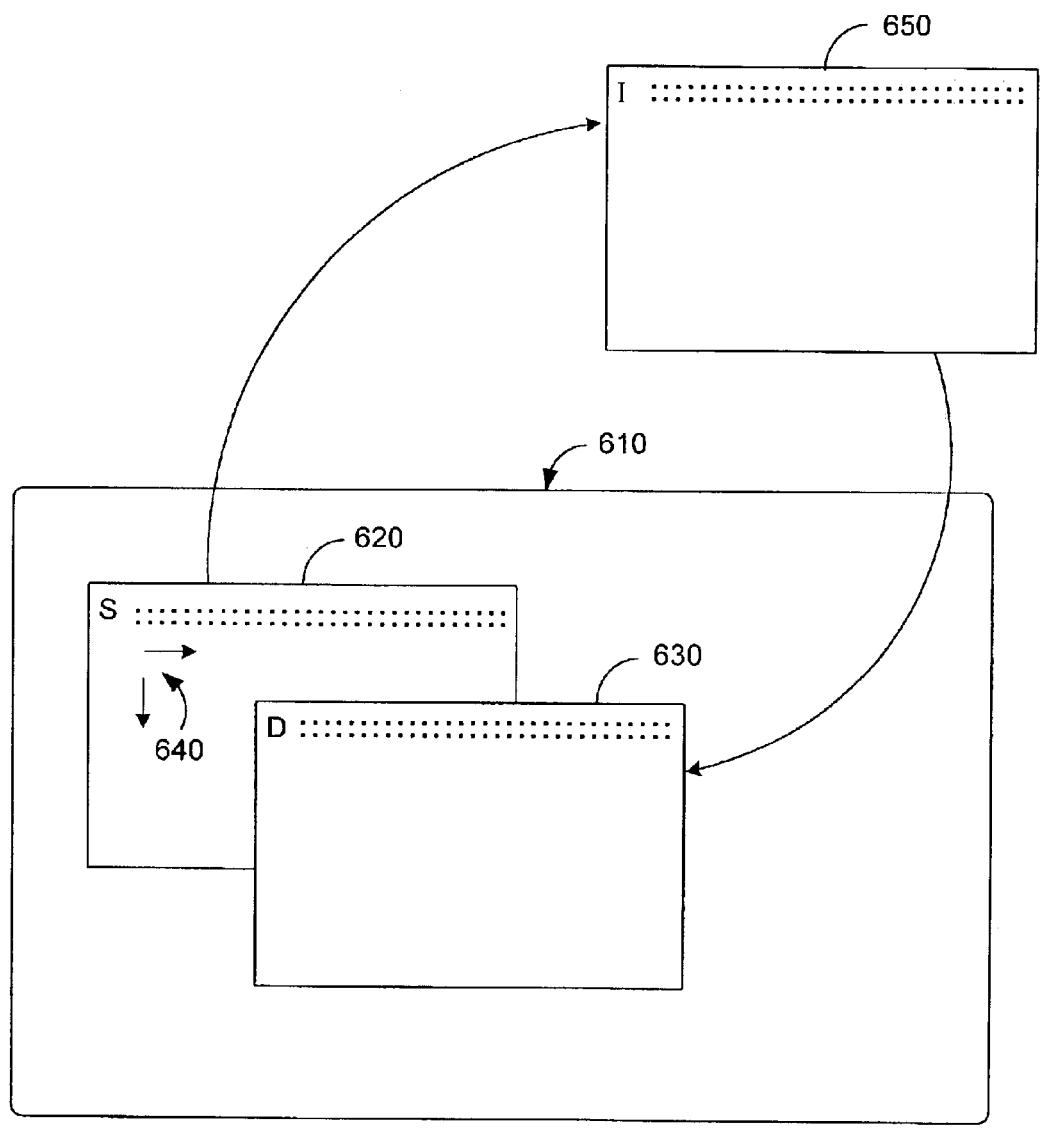
FIG. 13 is a diagram illustrating the performance of a BLT operation on a graphics display in accordance with one embodiment of the invention, when a source and destination window overlap.

In this regard, reference is made to FIG. 13. As illustrated in FIG. 13, the locations of the source window 620 and destination window 630 overlap. Generally, a BLT is performed, as denoted by arrows 640, beginning at the top of the source window 620 and copying each scan line into the destination window 630. However, in the situation illustrated in FIG. 13, once the first scan line is reached that overlaps or intrudes with the destination window 630, the original data from the source window will have been lost or overwritten by the new destination-window data. Accordingly, alternative embodiments according to the present invention for handling this circumstance will be further discussed. One such alternative method is illustrated in FIG. 13. In this approach, the source window 620 is copied to the destination window location 630 through an intermediate window location 650. As is illustrated in FIG. 13, the memory location for the intermediate window 650 is in some location that is outside the locations corresponding to the graphics screen 610, and therefore outside of the frame buffer memory. It is observed that an intermediate windowing move, such as that illustrated in FIG. 13, avoids the problem discussed above, whereby pixel data from the source window is overwritten during the BLT process.

Figure 14A:
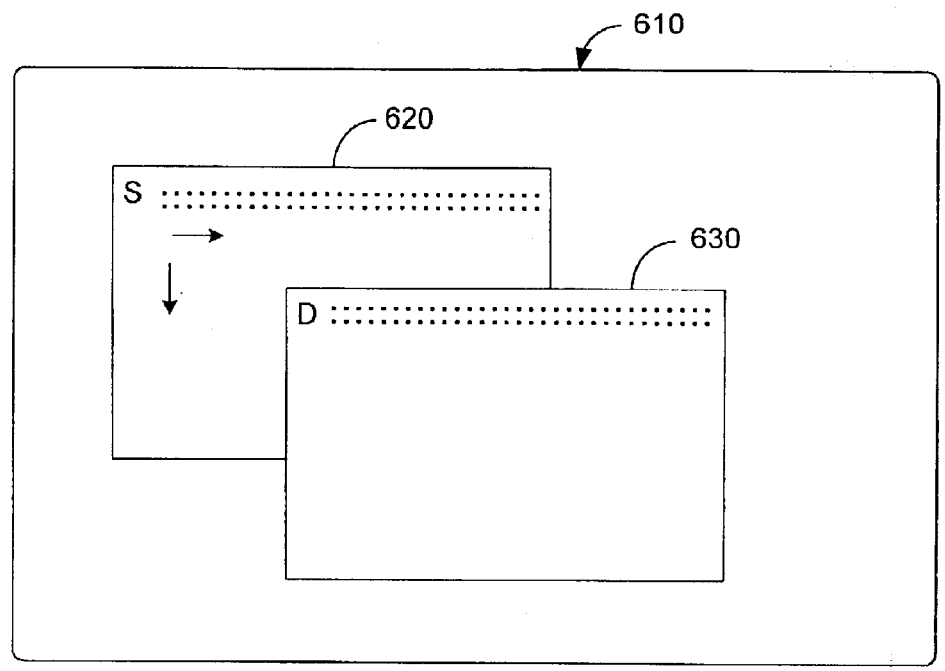
FIGS. 14A and 14B are diagrams illustrating the performance of a BLT operation on a graphics display in accordance with another embodiment of the invention, when a source and destination window overlap.
Figure 14B:
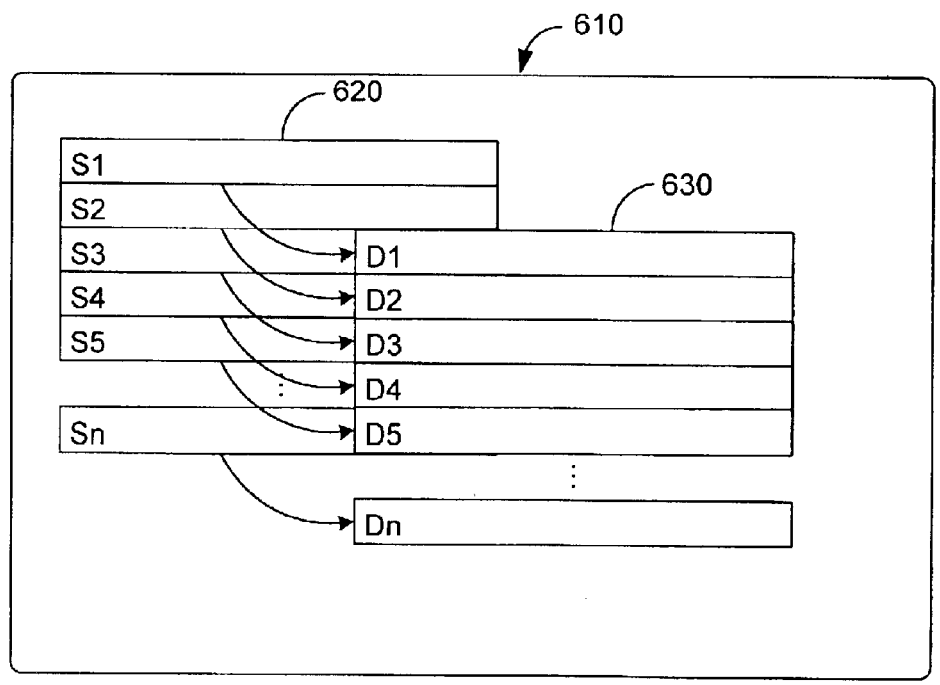

In an alternative embodiment, the source window 620, and therefore destination window 630, may be partitioned into a plurality of windows. This approach is illustrated in FIGS. 14A and 14B. More specifically, the source window 620 is partitioned into n source windows $S_1$ through $S_n$. Each of these windows is moved to the corresponding destination window location. So long as there is a vertical offset between the source window and destination window, this approach will work. In the embodiment illustrated in FIG. 14B, if the destination window is vertically displaced below the source window 620, then it will be desirable to first copy the source window $S_n$ to the corresponding destination partition $D_n$. Thereafter, each of the sequential source window partitions may be copied to the corresponding destination window locations, and no pixel data from the source window will be prematurely overwritten. Conversely, if the destination window 630 had been vertically displaced above the source window 620, then the first partition $S_1$ of the source window would be copied first.

It should be appreciated that the partitions $S_1$ through $S_n$, consistent within the scope and spirit of the embodiment, may be of varying vertical dimensions. In one embodiment, the partitions may be a single scan line.

Figure 15A:
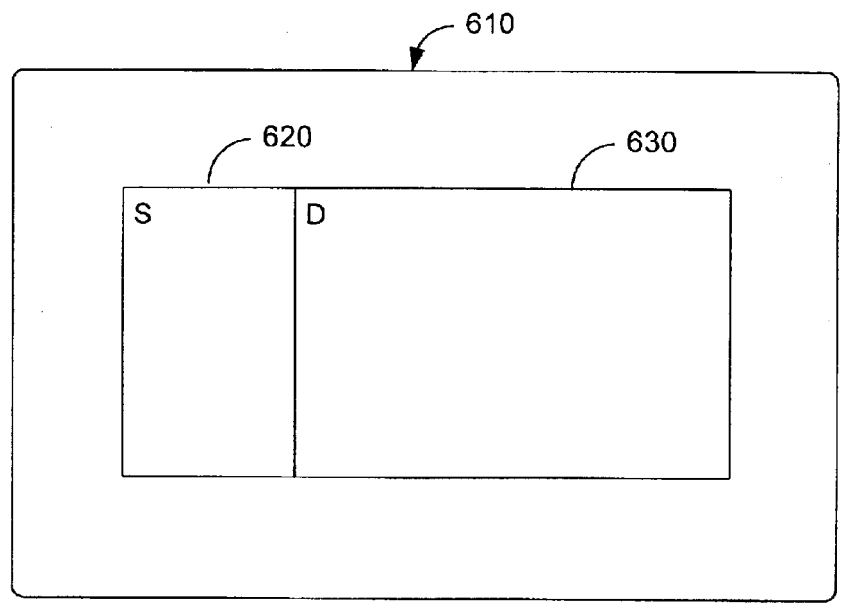
FIGS. 15A and 15B are diagrams illustrating the performance of a BLT operation on a graphics display in accordance with yet another embodiment of the invention, when a source and destination window overlap.
Figure 15B:
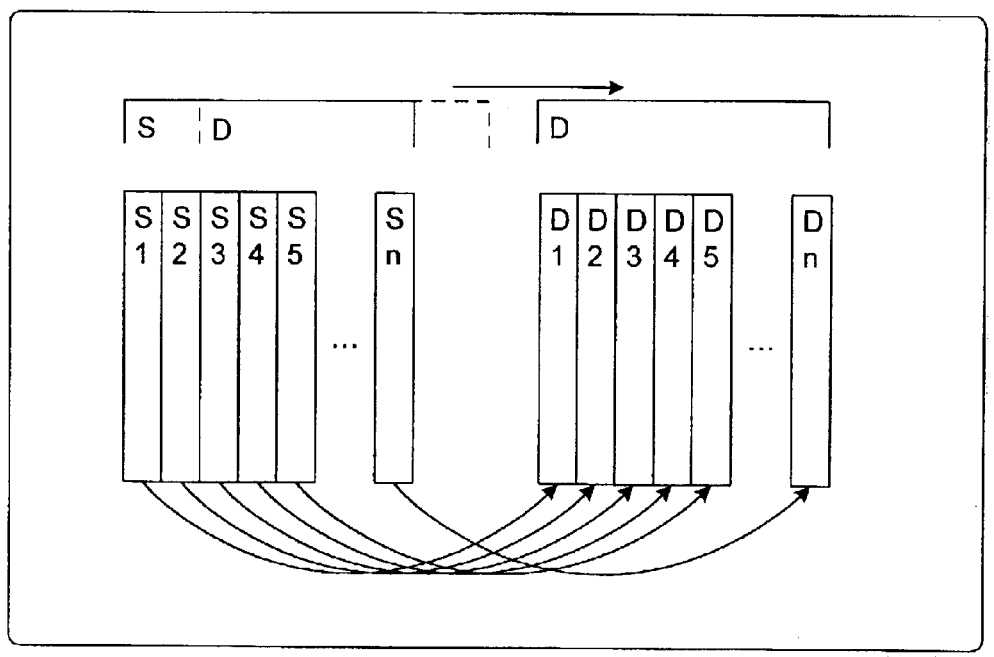

It should be appreciated that the horizontal partitioning as illustrated in FIG. 14B, will work effectively, so long as there is some vertical displacement between the source and destination window locations. However, if there is purely a horizontal displacement between the source window 620 and destination window 630, then vertical partitions should be implemented to effect the BLT operation. Such an embodiment is illustrated in FIGS. 15A and 15B. As illustrated, the source window 620 may be partitioned into a plurality of vertical partitions S1 through Sn. Each of these partitions may be copied individually to a corresponding destination location. If the horizontal offset of the destination window is to the right, as illustrated in the embodiment of FIGS. 15A and 15B, then it will be desirable to begin the BLT operation by moving the right most source partition $S_n$ first.

In accordance with the invention, the BLT operation is performed by utilizing texture-mapping hardware and/or other texture-mapping subsystems. In this regard, the environmental system and method that was described in connection with FIGS. 2 through 11 offers a unique embodiment for implementing the texture-mapping approach of the invention. Specifically, the unified memory structure within the nodal architecture provides an environment that is particularly unique and conducive to the use of texture-mapping subsystems in performing a BLT operation.

In accordance with the invention, a source window location may be assigned to coordinates of a texture map, and that texture map may be applied to the destination window location. Since the various memories that are associated with the different nodes of the nodal architecture are unified, such that each node can access memory from another node in the unified or coherent fashion, texture maps need not be redundantly copied among the various nodes. Again, it should be appreciated by persons skilled in the art that the architecture that has been described above, defining a unified memory and using the message-passing feature to inter-communicate among the various nodes, can be effectively used to employ a texture-mapping subsystem for implementing a BLT operation. With regard to the unified memory structure, it will be appreciated that, in a nodal architecture having a plurality of rasterizers distributed across a plurality of nodes, the frame buffer may be defined across a plurality of the local memories. Again, the unified memory structure allows for a single frame buffer memory to be distributed across a plurality of nodes, as opposed to having multiple instances of a frame buffer memory copied among, the various nodes. Likewise, a texture map defined to be the frame buffer may be distributed across a plurality of a nodes, as opposed to being replicated across a plurality of nodes.

Figure 16:
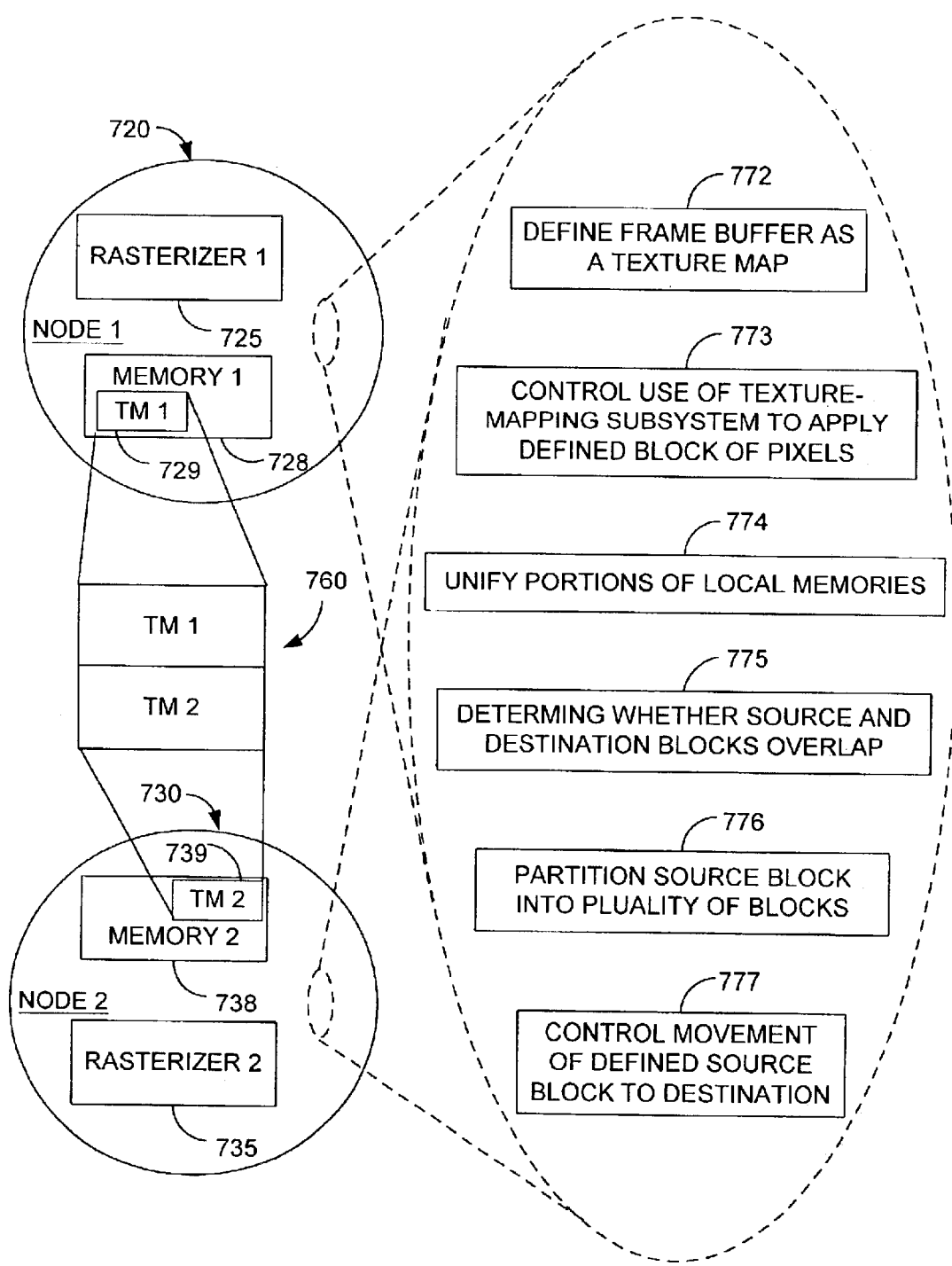
FIG. 16 is a block diagram illustrating certain logic blocks and other functional components of one embodiment of the invention.

In view of the foregoing, reference is made to FIG. 16, which is a block diagram illustrating certain features of the inventive system. The embodiment illustrated in FIG. 16 illustrates two nodes 720 and 730. It will be appreciated that these nodes will be similar to the nodes described above (e.g. node 408). However, for simplicity, many elements of these nodes have been omitted from the illustration of FIG. 16. Each node 720 and 730 is illustrated as having a rasterizer 725 and 735 and a memory 728 and 738, respectively. Consistent with the inventive features, additional nodes (not shown) may also be present. The memories 728 and 738, consistent with the description provided above, may store a variety of information. Among the data stored in these memories 728 and 738, however, is the frame buffer containing the data that is to be displayed. The frame buffer may be defined to be a texture map. As illustrated in FIG. 16, the texture map may be defined partially in memory 728 and partially from memory 738. These texture map portions are denoted by reference numerals 729 and 739. As illustrated, the texture-mapping portions 729 and 739 are not duplicative, but rather combined to form a single, unified texture map 760. This texture map may be utilized by a texture-mapping subsystem to perform a BLT operation by effectively applying the defined texture map 760 to the new or destination location within the frame buffer memory.

More specifically, the entire frame buffer may be defined as a texture map. Since a first block of pixels (e.g., the source window) occupies only a portion of the frame buffer, moving such a portion to another location within the frame buffer may be accomplished by setting up the texture-mapping hardware with appropriate coordinate values (corresponding to the block of pixels to be moved). Since the 2D region of a texture map is generally defined in a linear address space, the width (i.e., memory space address width) of the block of pixels to be moved may be used in order to properly reference subblocks. The texture map with the defined coordinate values may be used to implement the BLT operation.

It will be appreciated that various functional components may be provided for carrying out this functional operation. These include a functional block, or logic, 772 for defining the frame buffer as a texture map. Another functional operation comprises logic for controlling the use of a texture-mapping subsystem to apply the defined block of pixels to a destination location. This includes logic for setting up the texture-mapping subsystem with coordinate values that correspond to the block of pixels to be moved. Of course, logic 774 will also be provided for unifying portions of the local memories.

One embodiment for carrying out this operation has been described above in relative detail. Logic 775 may also be provided for determining whether the source and destination blocks overlap. As mentioned above, when the source and destination blocks overlap, it creates potential problems for performing a direct move of the data from the source locations to the destination locations. Accordingly, logic 776 may be provided for partitioning the source block into a plurality of source blocks. Likewise, logic 777 may be provided for controlling the movement of the defined source block (or blocks) to a destination location. This logic 777 may operate on a plurality of source partition blocks, or alternatively may operate, as discussed in connection with FIG. 13, to perform an intermediate move of the source data to an intermediate memory location, and thereafter perform a second move operation to move the source information to a destination location. Again, these move operations are performed utilizing a texture-mapping subsystem. In doing so, dedicated hardware and other subsystem components for performing BLT operations may be eliminated.

It should be understood that the functional blocks illustrated in FIG. 16 may represent of hardware, software, firmware, or various combinations thereof, depending on the particular system goals and design objectives.

Figure 17:
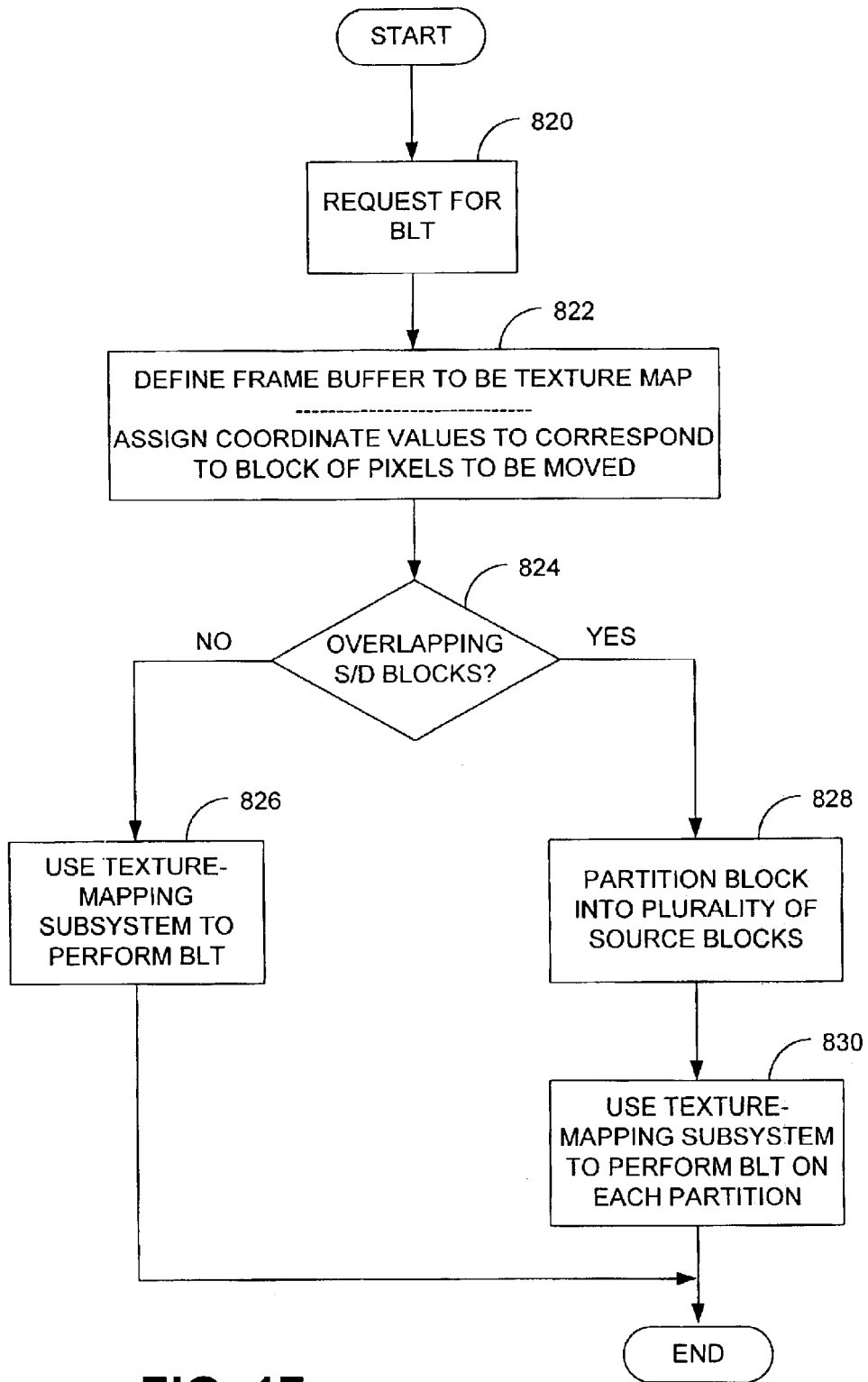
FIG. 17 is a flowchart illustrating top-level operation of one embodiment of the invention.

Reference is made to FIG. 17, which is a flow chart illustrating a top-level operation of one embodiment of the present invention. In this embodiment, the system detects a request for a BLT at step 820. Thereafter, at step 822, the system defines a frame buffer as texture map, and assigns coordinate values from a source block that is to be moved to a destination location (step 822). The method may then evaluate the source block and destination block to determine whether they have overlapping portions (step 824). If not, the method may then use the texture-mapping subsystem to perform the BLT (step 826). If, however, the source and destination blocks are determined to have overlapping portions, then the system may partition the source block into a plurality of source blocks (step 828). As described above, this step may be carried out by partitioning the source block into a plurality of horizontally-disposed partitions, or vertically-disposed partitions. Furthermore, the partitions may be of varying dimensions, including a single scan line. Finally, the method utilizing a texture-mapping subsystem to perform a BLT on each partition (step 830).

Figure 18:
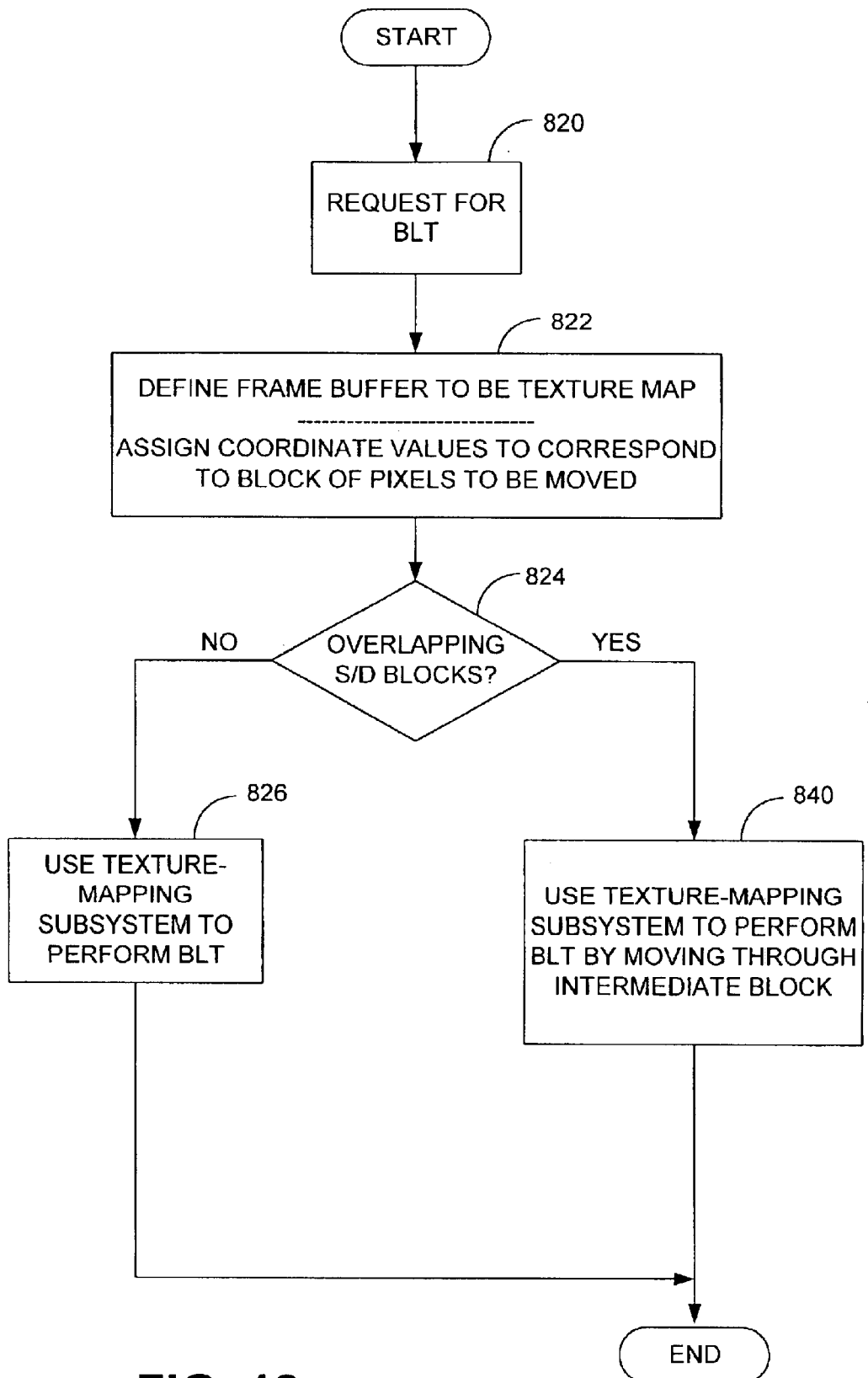
FIG. 18 is a flowchart illustrating top-level operation of another embodiment of the invention.

Reference is now made to FIG. 18, which is a flow chart illustrating a method constructed in accordance with an alternative embodiment of the invention. In accordance with this embodiment, steps 820, 822, 824, and 826 are similar to those described in connection with FIG. 17. However, in this embodiment, if step 824 determines that the source and destination blocks have overlapping portions, then the system may use a texture-mapping subsystem to perform a BLT by moving the source block first to an intermediate location that is outside the display area (e.g., outside the frame buffer) and thereafter, moving the intermediate block to the destination location.

Any process descriptions or blocks in flow charts should be understood as representing modules, segments, or portions of code which include at least one executable instruction for implementing specific logical functions or steps in the process, and alternate implementations are included within the scope of the preferred embodiment of the present invention in which functions may be executed out of order from that shown or discussed, including substantially concurrently or in reverse order, depending on the functionality involved, as would be understood by those reasonably skilled in the art of the present invention.

What is claimed is:

1. An apparatus for performing a block transfer (BLT) comprising:

logic for defining a texture map from a source segment of memory corresponding to a frame buffer;

logic for configuring a texture-mapping subsystem with coordinate values corresponding to a first block of pixels on a display; and logic for using the configured texture-mapping subsystem to perform a texture-mapping operation on a destination segment of memory corresponding to a second block of pixels on the graphic display, wherein the texture-mapping operation effects a BLT of the data from the first block of pixels to the second block of pixels.

2. The apparatus as defined in claim 1 further comprising:

a plurality of nodes, each node having a rasterizer and a local memory; and logic for unifying portions of each local memory such that segments of a texture map defined in separate local memories define a single texture map.

3. The apparatus as defined in claim 1 further comprising logic for determining whether the first block of pixels and second block of pixels overlap.

4. The apparatus as defined in claim 1 further comprising logic for partitioning the source segment into a plurality of source segments, if the first block of pixels and second block of pixels overlap.

5. The apparatus as defined in claim 4, wherein each of the plurality of source segments comprises a memory segment corresponding to a single scan line.

6. The apparatus as defined in claim 4, wherein each of the plurality of source segments comprises a memory segment corresponding to a single pixel column.

7. The apparatus as defined in claim 1, further comprising logic for controlling the movement of the defined source segment from a source location directly to a destination location.

8. The apparatus as defined in claim 1, further comprising logic for controlling the movement of the defined source segment from a source location indirectly to a destination location by way of a memory location that corresponds to a visual location outside the dimensions of a display.

9. A method for performing a block transfer (BLT) in a computer graphics system, the improvement comprising:
using a texture-mapping subsystem to perform the BLT configuring the texture-mapping subsystem with coordinate values corresponding to a block of pixels to be transferred; and
partitioning the block into a plurality of blocks, if a source region and a destination region for the block overlap.

10. The method as defined in claim 9 wherein using a texture-mapping subsystem further comprises defining a texture from data within memory locations of at least two memories of a plurality of nodes and unifying portions of the at least two memories such that segments of a texture map defined in separate memories define a single texture map.

11. The method as defined in claim 9, wherein partitioning the block into a plurality of blocks more specifically comprises partitioning the block into a plurality of blocks, wherein each of the plurality of blocks comprises a single scan line.

12. The method as defined in claim 9, wherein partitioning the block into a plurality of blocks more specifically comprises partitioning the block into a plurality of blocks, wherein each of the plurality of blocks comprises a single pixel column.

13. The method as defined in claim 9, further comprising moving the block from a source location directly to a destination location.

14. The method as defined in claim 9, further comprising moving the block from a source location indirectly to a destination location by way of a memory location that corresponds to a visual location outside the dimensions of a display.

15. A method for performing a block transfer (BLT) comprising:
defining a texture map from a source segment of memory corresponding to a frame buffer;
configuring a texture-mapping subsystem with coordinate values corresponding to a first block of pixels on a display; and
using the configured texture-mapping subsystem to perform a texture-mapping operation on a destination segment of memory corresponding to a second block of pixels on the graphic display, wherein the exture-mapping operation effects a BLT of the data from the first block of pixels to the second block of pixels.

16. The method as defined in claim 15 wherein defining a texture map further comprises defining a texture from data within memory locations of at least two memories of a plurality of nodes; and
unifying portions of each local memory such that segments of a texture map defined in separate local memories define a single texture map.

17. The method as defined in claim 15 further comprising determining whether the first block of pixels and second block of pixels overlap.

18. The method as defined in claim 15 further comprising logic for partitioning the source segment into a plurality of source segments, if the first block of pixels and second block of pixels overlap.

19. The method as defined in claim 18, wherein partitioning the source segment more specifically comprises partitioning the source segment into a plurality of source segment, each comprises a memory segment corresponding to a single scan line.

20. The method as defined in claim 18, wherein partitioning the source segment more specifically comprises partitioning the source segment into a plurality of source segment, each comprises a memory segment corresponding to a single pixel column.

21. The method as defined in claim 15, further comprising controlling the movement of the defined source segment from a source location directly to a destination location.

22. The method as defined in claim 15, further comprising controlling the movement of the defined source segment from a source location indirectly to a destination location by way of a memory location that corresponds to a visual location outside the dimensions of a display.

* * * * *